United States Patent
Afshar et al.

(10) Patent No.: US 6,560,584 B1
(45) Date of Patent: May 6, 2003

(54) METHOD AND APPARATUS FOR PREDICTION OF SYSTEM RELIABILITY

(75) Inventors: Nader Afshar, Indianapolis, IN (US); Gopal Chaudhuri, Indianapolis, IN (US); Kuolung Hu, Indianapolis, IN (US)

(73) Assignee: Advanced Research & Technology Institute, Indianapolis, IN (US)

( * ) Notice: Subject to any disclaimer, the term of this patent is extended or adjusted under 35 U.S.C. 154(b) by 0 days.

(21) Appl. No.: 09/452,825

(22) Filed: Dec. 1, 1999

Related U.S. Application Data
(60) Provisional application No. 60/144,999, filed on Jul. 22, 1999.

(51) Int. Cl.[7] ............................. G06F 15/18; G06G 7/00
(52) U.S. Cl. ..................... 706/21; 702/181; 702/185
(58) Field of Search ............................ 706/21; 702/181, 702/185

(56) References Cited

U.S. PATENT DOCUMENTS
5,548,715 A * 8/1996 Maloney et al. ............. 714/28
5,991,707 A * 11/1999 Searles et al. .............. 702/185

OTHER PUBLICATIONS
Nair et al, "Real—Number Codes for Fault–Tolerant Martix Operations on processor Arrays" IEEE Transactions on Computers. Apr. 1990.*

* cited by examiner

*Primary Examiner*—George B. Davis
(74) *Attorney, Agent, or Firm*—Doreen J. Gridley; Thomas A. Walsh; Ice Miller

(57) ABSTRACT

A method and apparatus for prediction of system reliability is disclosed. The method comprises the steps of: (a) identifying the minimal path set of components which must function for the system to function; (b) constructing a minimal path set matrix by representing the minimal path sets as binary numbers in the matrix; (c) constructing a design matrix from OR operations on sets of columns of the minimal path set matrix whose results are appended to the original minimal path set matrix; (d) constructing a vector of ones having signs related to the position in the vector; and (e) calculating the system reliability from the design matrix, vector of ones and the reliabilities of each of the components of the system. The method of the present invention also determines the structure function of the system from the design matrix, vector of ones, and the states of the components of the system. The apparatus for performing the method of the present invention comprises a programmable processor. The present invention is capable of accurately predicting system reliability of complex systems composed of many components and is easy to implement and to use.

5 Claims, 12 Drawing Sheets

Components reliability importance over time, 2-out-of-3 System

METHOD AND APPARATUS FOR PREDICTION OF SYSTEM RELIABILITY

RELATED APPLICATIONS

This is a non-provisional patent application based on provisional application Ser. No. 60/144,999, filed Jul. 22, 1999.

REFERENCE OF COMPUTER PROGRAM LISTING APPENDIX

This application contains a computer program listing, attached as Appendix A. This appendix has been submitted on a single compact disc (in duplicate which contains Appendix A in a file named "09452825. APPENDIX A.txt" of size 33 KB created on May 17, 2002. The material contained in this file is hereby incorporated by reference.

FIELD OF THE INVENTION

The present invention relates to a method and apparatus for prediction of system reliability, and in particular, to a method and apparatus that can be used to predict reliability of complex systems composed of many components.

BACKGROUND OF THE INVENTION

A system is by definition a combination of interrelated elements (or components) designed to work as a coherent entity. During use, one or more of these elements may fail, thus causing the entire system or part of a system, to fail. The times at which such failures will occur are unknown, but it is often possible to determine the probability of failure for the individual elements and from these to determine the reliability of the system of the whole.

Reliability studies are extremely important in engineering design. The ability to compute the reliability of a system or subsystem enables designers to identify and address those systems more likely to fail. For example, as is well known in the art, the ability to compute a subsystem's or component's reliability is critical to numerous aspects of production quality control and manufacturing efficiency. Furthermore, as is also well known in the art, system reliability can directly impact system design when safety is a primary concern.

For example, a television manufacturer desires to make certain that its product will likely remain operational for an extended period of time, such as ten years. A fire detection system should remain operational for even longer, such as thirty years. If a product developer has developed two competing designs for a product, it wishes to know the reliability of each design to make its decision as to the preferred design.

Reliability predictions rely heavily on principles of probability. As systems become more complex and contain larger numbers of elements, the problems of reliability become more difficult and take on added significance. In turn, as the number of elements grows larger, the difficulty in computing system reliability grows exponentially.

Various approaches have been taken to deal with system reliability. Approaches range from actual testing of the product to computation of the exact system reliability. Some of these approaches are patented. For example, one methodology used to actually test the product is disclosed in U.S. Pat. No. 5,548,718 in which a mapping mechanism and automated testing system are used for testing software functionality. U.S. Pat. No. 5,014,220 discloses a reliability model generator which aggregates low level reliability models into a single reliability model based on the desired system architecture.

In the past, numerous approaches to estimate system reliability of complex systems have been proposed since computation of the actual reliability is monumental or impractical for systems composed of many components. However, these prior art approaches have distinct limitations. One such approach well known in the art was proposed by Aven. (Aven, T., "Reliability/Availability Evaluation of Coherent System based on Minimal Cut Sets", *Reliability Engineering*, 13, 93–104 (1986)). Aven attempted to compute exact system reliability using a method based on minimal cut sets. A cut set is a set of components, which by failing causes the whole system to fail. A cut set is minimal if it cannot be reduced without losing its status as a cut set. The prominent shortcoming of this approach is that the method depends on the initial choices of two parameters. Any error introduced in the initial choice of these parameters would propagate through the computation. As a result, as the system being studied grew larger, the accuracy of the approach declined. Further, the method of Aven is unable to deal with the case when the component survival functions belong to the Increasing Failure Rate Average (IFRA) class of life distributions. The IFRA class is defined as follows: a life distribution function F is said to belong to an IFRA class if $-(1/t) \log (1-F(t))$ is non-decreasing in $t \geq 0$. It is known to be the most important class of life distributions. The well-known distributions like Exponential, Weibull, and Lognormal are included in this class.

Another approach used often in industry is the Barlow & Proschan bound ("B-P bound") in which bounds are placed on system reliability. (Barlow, R. E. and F. Proschan, *Statistical Theory of Reliability and Life Testing*, Holt, Rinehart and Winston Inc, New York (1975).) The B-P bound approach is limited because it is, after all, a bound, and thus cannot predict the exact system reliability. Also, the bound is not valid on the entire real line. The bound is point-wise. Further, the B-P bound approach cannot deal with the IFRA case. Yet another approach has been to resort to minimum or maximum bounds of a system's reliability. The min-max bounds approach is limited because they are bounds, and thus cannot predict exact system reliability. Also, the min-max bounds cannot deal with the IFRA case. Further, the min-max bounds require the knowledge of both path and cut sets. However, these approaches are inherently inaccurate as they seek only to give upper and lower values rather than to predict exact reliability of the system. Accordingly, in many applications where cost or accuracy are critical, such results are inadequate.

In an effort to minimize the increasing inaccuracy of these approaches as the complexity of a system increases, it is well known in the art to divide a complex system into subsystems each having fewer components, and to compute the reliability of each subsystem. The aforementioned U.S. Pat. No. 5,014,220, takes such an approach by dividing a complex system into simpler subsystems based on the use of a knowledge database. Although the general approach of computing "sub-reliability" addresses the inherent difficulty of computing reliability of complex systems, this approach introduces additional error into the computation, as each sub-reliability must be joined with the others to yield the reliability of the entire system. Since this joinder is usually inaccurate, it introduces error into the calculation of reliability.

Thus, for complex systems determination of the exact reliability of the system is extremely difficult and sometimes thought to be impossible to determine. It is therefore desired to develop an approach to determine exact system reliability which accurately calculates the reliability of even very complex systems without being computationally burdensome. The desired approach should be easy to implement and to use, should not require that the system be dissected into subsystems for determination of reliability, and should not be dependent on selection of parameters whose inaccurate selection is detrimental to the determination of reliability. Further, the method should predict exact reliability rather than bounds on the reliability.

SUMMARY OF THE INVENTION

Figure 1:
FIG. 1 shows a block diagram of a series structure that can be analyzed according to the method of the present invention.

The method of the present invention comprises the steps of: (a) identifying the minimal path set of components which must function for the system to function; (b) constructing a minimal path set matrix by representing the minimal path sets as binary numbers in the matrix; (c) performing an OR operation on the minimal path set matrix's rows; (d) selecting the columns of the minimal path set matrix in pairs and performing an OR operation on their respective rows; (e) appending the corresponding column to the minimal path set matrix; (f) repeating step (d) with the three columns and performing an OR operation on their respective rows; (g) appending the column resulting from step (f) to the minimal path set matrix; (h) repeating the selection, ORing and appending for increasingly larger sets of columns in accordance with the procedures of steps (c), (d) and (e) until the size is equal to the total number of minimal path sets to construct a design matrix, (i) constructing a vector of ones having signs based on the position in the vector; and (j) calculating the system reliability from the design matrix, vector of ones, and reliabilities of the individual components of the system. The structure function of the system is calculated from the design matrix, vector of ones, and the states of the components of the system. The present invention is capable of accurately predicting system reliability of complex systems composed of many components and is easy to implement and to use. In addition, the method of the present invention avoids many of the shortcomings of prior art systems, for the method does not require dissection of the system into subsystems, is not based on arbitrary or inaccurate parameters, and is a prediction of exact reliability, not bounds on reliability.

The apparatus of the present invention comprises a processor for performing most of the steps of the method. It is possible for the minimal path sets and the total number of minimal path sets to be determined by the processor, or may be input from another processor or by a human. Results are provided on output devices well known in the art. The apparatus need not be special equipment, but rather may be a personal computer commonly used.

DETAILED DESCRIPTION OF THE INVENTION

According to the present invention, a representation for the structure function of a coherent system, which is suitable for computer implementation is first determined. Since a structure function determines a system uniquely, a method for determining system reliability based on its representation is presented herein. Section 1 presents some notations, definitions and prior art theorems for bounds on reliability. The method of the present invention is described in Section 2. Section 3 discusses the following aspects: (i) the illustration of the method of the present invention through some well known structures such as series, parallel, k-out-of-n, and a fire detector system, (ii) the computation of some important reliability measures (Birnbaum's structural and reliability importance) for such structures and, (iii) the application of Chaudhuri bound, Barlow and Proschan bound, and the Min-max bounds to these structures for comparison to the exact system reliability determined according to the method of the present invention. These bounds are implemented for the above mentioned structures. It is found that the use of the Chaudhuri bound has an edge over the other methods. The apparatus for predicting system reliability of the present invention is discussed in Section 4, and some conclusions about the method and apparatus are set forth in Section 5.

1. NOTATIONS, DEFINITIONS, AND PRIOR ART THEOREMS FOR BOUNDS ON RELIABILITY a. Notations

In the description of the method of the present invention, the following notations are used:

| Notation | Description |
| --- | --- |
| n | Number of components |
| x | $(x_1,...,x_n)'$, the states of the components |
| $\Phi(x)$ | The state of the system |
| $X_i$ | Indicator variable denoting the state of the $i^{th}$ component |
| $p_i$ | $P(X_i = 1)$, the reliability of the $i^{th}$ component |
| h | $P(\Phi(x) = 1)$, the reliability of the system |
| $(.;x)'$ | $(x_1, x_2,..., x_{i+1},.., x_{i+1},..., x_n)'$ |
| h(p) | h is a function of $p = (p_1,...,p_n)$, when the components are independent |
| $I_h(i)$ | Reliability importance of the $i^{th}$ component |
| $B_\Phi(i)$ | Birnbaum measure of structural importance of the $i^{th}$ component |
| $\overline{F}(t)$ | The survival function, 1-F(t), where F(t) is the system life distribution |

Let $X_i$ denote the state of the $i^{th}$ component so that $$X_i = \begin{cases} 1 & \text{if the } i\text{th component is working} \\ 0 & \text{otherwise} \end{cases}$$

Let $\Phi(\underline{x})$ denote the structure function of the system so that $$\Phi(x) = \begin{cases} 1 & \text{if the system is working} \\ 0 & \text{otherwise} \end{cases}$$

b. Definitions

The following defined terms are used throughout the description of the method of the present invention:

Coherent System: A system is said to be coherent if all its components are relevant and the structure function is increasing in each argument.

Minimal Path Sets: A path set is a set of components of a system, which by functioning ensures that the system is functioning. A path set is said to be minimal if it cannot be reduced without losing its status as a path set.

Minimal Cut Sets: A cut set is a set of components, which by failing causes the whole system to fail. A cut set is said to be minimal if it cannot be reduced without losing its status as a cut set.

Birnbaum's Reliability Importance: The Birnbaum's measure of reliability importance of component i, denoted by $i_h(i)$, is given by $$I_h(i) = \frac{\partial h(\underline{p})}{\partial p_i} = h(1_i, \underline{p}) - h(0_i, \underline{p})$$

Birnbaum's Structural Importance: The Birnbaum's measure of structural importance of component i, denoted by $B_\Phi(i)$, is given by $$B_\Phi(i) = \left[h(1_i, \underline{p}) - h(0_i, \underline{p})\right]_{p_j = \frac{1}{2}, j \neq i}$$

OR operation: The OR operation, denoted by $\oplus$, is performed on two binary numbers in the following way:

(i) $0 \oplus 0 = 0$
(ii) $1 \oplus 0 = 1$
(iii) $0 \oplus 1 = 1$
(iv) $1 \oplus 1 = 1$ b. Prior Art Theorems for Bounds on Reliability

For purposes of discussion of prior art theorems for bounds on reliability, let a coherent system consist of n statistically independent components. It is well known that if the life distributions of all these components belong to the Increasing Failure Rate Average (IFRA) class, then the life distribution of the system also belongs to the IFRA class. Below are three prior art theorems for predicting system reliability for a coherent system.

Theorem 1: Chaudhuri Bound:

The Chaudhuri bound is obtained on the reliability function of a coherent system consisting of independent components with IFRA distributions. (Chaudhuri G., Deshpande, J. V. and A. D. Dharmadhikari, A. D., "Some Bounds on Reliability of Coherent Systems of IFRA Components", *Journal of Applied Probability*, 28, 709–714 (1991).) Specifically, let $F_i(t)$ have IFRA life distributions and $0 < a < \infty$ for $i = 1, \ldots, n$. Then, if $h(\overline{F}_1(t), \ldots, \overline{F}_n(t))$ denotes the survival function of a coherent system, then:

$$h[\overline{F}_1(t), \ldots, \overline{F}_n(t)] \begin{cases} \geq h\left([\overline{F}_1(a)]^{t/a}, \ldots, [\overline{F}_n(a)]^{t/a}\right) & \text{for } t \leq a \\ \leq h\left([\overline{F}_1(a)]^{t/a}, \ldots, [\overline{F}_n(a)]^{t/a}\right) & \text{for } t \geq a \end{cases}$$

for $0 < a < \infty$ and $t > 0$ where n is the number of components in the system.

The elegance of the Chaudhuri bound is that it is valid on the entire real line. The choice of a depends on the customer's specification. The bounds here exploit the knowledge of some quantile of the component distribution functions.

Theorem 2: Min-max Bounds:

Let $\Phi$ be a coherent structure with state variables $x_1, \ldots, x_n$. Denote the minimal path sets by $P_1, \ldots, P_m$ and the minimal cut sets by $K_1, \ldots, K_k$. Then $$\max_{1 \leq j \leq m} P\left(\min_{i \in P_j} X_i = 1\right) \leq P(\Phi(\underline{X}) = 1) \leq \min_{1 \leq j \leq k} P\left(\max_{i \in K_j} X_i = 1\right)$$

If, in addition, it is assumed that $x_1, \ldots, x_n$ are associated, then $$\max_{1 \leq j \leq m} \prod_{i \in P_j} p_i \leq P(\Phi(\underline{X}) = 1) \leq \min_{1 \leq j \leq k} \prod_{i \in K_j} p_i$$

where $p_i = P(X_i = 1)$, the reliability of component i, $$\prod_{i=1}^{n} p_i = p_1 p_2 \ldots p_n, \text{ and}$$

$$\coprod_{i=1}^{n} p_i = 1 - (1 - p_1)(1 - p_2) \ldots (1 - p_n).$$

As used herein, the Min bound of the Min-Max bound is the upper bound, while the Max bound is the lower bound.

Theorem 3: Barlow-Proschan Bound (B-P Bound):

Let F be IFRA with mean $\mu$. Then, for fixed $t > 0$:

$$\overline{F}(t) \leq \begin{cases} 1 & \text{for } t \leq \mu \\ e^{-\omega t} & \text{for } t > \mu \end{cases}$$

where $\omega > 0$, satisfies:

$$1 - \omega\mu = e^{-\omega t}$$

2. THE METHOD OF THE PRESENT INVENTION

The method of the present invention is described in the following steps:

Step 1: Identify the minimal path sets of the coherent structure under study. For a given minimal path set, form a vector v of dimension n (the number of components in the system) as:

$$v_i = \begin{cases} 1 & \text{if } i\text{th component of the system belongs to the minimal path set} \\ 0 & \text{otherwise} \end{cases}$$

Then, construct matrix $P=(v_1, v_2, \ldots, v_m)_{n \times m}$, where $v_j$ corresponds to the $j^{th}$ minimal path set, $j=1, \ldots, m$. P will be called the minimal path set matrix.

Step 2: Select the columns of the minimal path set matrix P in pairs and perform an OR operation on their respective rows. There are $$\binom{m}{2}$$

such column combinations. At the end of each OR operation, the resulting column is appended to P, leading to the following matrix:

$$(P, P_1)_{n \times \left(m + \binom{m}{2}\right)}$$

In the above operation, the order in which pairs of columns are chosen is not important. All that is required is that all possible pairs of columns are ORed and the resulting columns appended to P.

Step 3: Now take all possible sets of three columns of P at a time and do an OR operation on their respective rows. At the end of this step, there will be $$\binom{m}{3}$$

new columns that will be appended to $(P,P_1)$ to yield $$(P, P_1, P_2)_{n \times \left(m + \binom{m}{2} + \binom{m}{3}\right)}$$

Step 4: Repeat step 2 taking i, i=4, ..., m columns of P at a time. In the very last step, all m columns of P will be ORed with each other resulting in the following matrix:

$$D = (P, P_1, P_2, \ldots, P_{m-1})_{n \times \left(m + \binom{m}{2} + \binom{m}{3} + \ldots + \binom{m}{m}\right)} =$$

$$(P, P_1, P_2, \ldots, P_{m-1})_{n \times (2^m - 1)}$$

D will be called the design matrix.

Step 5: Construct a vector $\underline{1}$ of ones of dimension $2^m - 1$ whose first m elements are 1's, the next $$\binom{m}{2}$$

entries have signs $(-1)^{2-1}=-1$, followed by $$\binom{m}{3}$$

entries with signs $(-1)^{3-1}=+1$, and so The last $$\binom{m}{m}$$

entry has sign $(-1)^{m-1}$. In general, the signs are determined according to the rule $(-1)^{i-1}$, where i denotes the number of columns of P that are taken at a time to be ORed in a particular step.

Step 6: Obtain the structure function of the system by:

$$\Phi(\underline{x}) = \sum_{j=1}^{2^m-1} \underline{1}(j) \cdot \prod_{i=1}^{n} x_i^{D(i,j)}$$

where D(i,j) denotes the (i,j)th element of D.

Step 7: Hence, letting $\underline{p}$ be the vector of component reliabilities, the system reliability is then given by:

$$h(\underline{p}) = \sum_{j=1}^{2^m-1} \underline{1}(j) \cdot \prod_{i=1}^{n} p_i^{D(i,j)} \quad 0 < p_i < 1$$

where 1(j) is the $j^{th}$ element of $\underline{1}$.

Since the minimal path sets uniquely determine a coherent structure, the representation of the structure function is unique.

Collectively, steps 2 through 4 may be expressed as the steps required to create design matrix D. If the number of minimal path sets is 1, then the design matrix is the minimal path set matrix, i.e., D=P if m=1. If the number of minimal path sets is greater than 1, then all possible sets of columns of the matrix are ORed and the results appended to the original minimal path set matrix. Initially, the size of the set of columns is two. After all sets of size 2 have been ORed and the results appended to the matrix, the size of the sets to be selected, ORed, and appended is increased by 1. This is repeated for all set sizes up through and including a set size equal to the total number of minimal path sets on. Of course, only one selection, ORing and appending will be required when the set size is equal to the total number of minimal path sets m.

It will be appreciated by those of skill in the art that the determination of the structure function in step 6 is not essential to determination of the reliability of the system. Steps 1 through 6 alone can be used to determine the system reliability of the complex system. However, determination of the structure function may be desirable to verify the accuracy of the method of the present invention.

3. SOME ILLUSTRATIVE EXAMPLES

In this section, the method of the present invention is further explained through application of the method to the following well known coherent structures (systems): series, parallel, 2-out-of-3 and bridge structures. In addition, for a practical application, a fire detector system is considered as well. Also, computed for each of these systems are the values of the Birnbaum structural importance and Birnbaum reliability importance.

Example 1

Series System

Referring now to FIG. 1, there is shown a block diagram of a series structure that can be analyzed according to the method of the present invention. As an example of the method of the present invention, consider the series system with two independent Weibull components shown in FIG. 1. This series has the survival function $$\exp\left(-\frac{t^{\alpha_i}}{\beta_i}\right), \quad i = 1, 2.$$

The structure function of the system is given by $$\Phi(\underline{x}) = x_1 x_2$$

Now, the application of the method of the present invention for this system is as follows:

Step 1: The system has only one path set: {1,2}. Hence, $$P = \begin{pmatrix} 1 \\ 1 \end{pmatrix}_{2 \times 1}$$

Steps 2, 3 and 4: There is only one column in P, hence no OR operations are required in this instance. Therefore, the Design matrix is:

$$D = \begin{pmatrix} 1 \\ 1 \end{pmatrix} \text{ and}$$

Step 5: The vector of ones is.

$$\underline{1} = (1)$$

Step 6: To verify the accuracy of the method of the present invention, the structure function of the system is:

$$\Phi(\underline{x}) = \sum_{j=1}^{1} 1(j) \prod_{i=1}^{2} x_i^{D(i,j)} = 1 \cdot x_1^1 x_2^1 = x_1 x_2$$

which agrees with the known structure function set forth above.

Step 7: The exact system reliability (the term "exact system reliability" as used herein and in the drawings refers to the system reliability as predicted according to the method of the present invention) is simply determined by the relationship:

$$h(\underline{p}) = \sum_{j=1}^{2^m-1} 1(j) \cdot \prod_{i=1}^{n} p_i^{D(i,j)} \quad 0 < p_i < 1$$

The resulting system reliability is discussed below in comparison to prior art bounds on reliability as determined by prior art methods.

Calculations for Prior Art Methods

To compare the results of the present method to those of prior art methods, calculations are necessary to determine the bounds for reliability according to the prior art methods (Chaudhuri bounds, B-P bounds, and minimum and maximum bounds), values for a, $\alpha_i$ and $\beta_i$ are necessary, where a is an unknown parameter of the life distribution in question, $\alpha_i$ is the shape parameter of the Weibull distribution for component i (an unknown parameter normally estimated from sample data), and $\beta_i$ is scale parameter of the Weibull distribution for component i (an unknown parameter normally estimated from sample data), and where i is index parameter for the n components of the system. The best candidate for a is the mean life of the system, or mean time to failure, MTTF. This quantity is computed using the following integral:

$$a = MTTF = \int_0^\infty \overline{F}(t) dt = \int_0^\infty h[\overline{F}_1(t), \ldots, \overline{F}_n(t)] dt.$$

The values of $\alpha_i$ and $\beta_i$ are given in the following vectors for both components.

alpha=[1.3 1.5]'
beta=[1.0 1.0]'

The above integral can only be solved numerically by the trapezoidal or Simpson rules. The following steps not only compute the MTTF, but they dynamically change the upper bound of the integral so that when the value of MTTF does not improve by more than a threshold, the integration stops.

Step a: Set the lower and upper limits of the integral to $t_{lb}$=0 and $t_{ub}$=1, respectively. Set the stepsize=0.25, old__MTTF=0, $\delta$=0.001, and t=0.

Step b: Set the time slice for integration to $\Delta t = (t_{ub} - 0)/100$.

Step c: Compute the values of $$\overline{F}_i(t) = \exp\left(-\frac{t^{\alpha_i}}{\beta_i}\right), \quad i = 1, 2,$$

for both components.

Step d: Use the $\overline{F}_i(t)$ values as vector p and compute h(p) as discussed earlier.

Step e: Save the current values of t and h(p) in two arrays, x and h, respectively.

Step f: Increment t by $\Delta t$, i.e. $t = t + \Delta t$.

Step g: If $t \leq t_{ub}$, go to step c; otherwise, go to step h.

Step h: Do numerical integration to compute MTTF using x and h arrays.

Step i: If |MTTF−old__MTTF|<$\delta$, then stop; otherwise, go to step j.

Step j: Set old__MTTF=MTTF. Set the new $t_{ub} = t_{ub}$+stepsize, go to step b.

Once the value of a=MTTF is computed, the h array contains the exact reliability function over the time interval from 0 to the last value of $t_{ub}$.

To compute the reliability bounds, similar steps as above are taken with slight modifications.

Step A: Set t=0.

Step B: Compute the values of $$[\overline{F}_i(a)]^{t/a} = \left[\exp\left(-\frac{t^{\alpha_i}}{\beta_i}\right)\right]^{t/a}, \quad i = 1, 2,$$

for both components.

Step C: Use the $[\overline{F}_i(a)]^{t/a}$ values as vector p and compute h(p) as discussed earlier.

Step D: Save the current value of h(p) in array b.

Step E: Increment t by $\Delta t$, i.e. $t = t + \Delta t$, where $\Delta t$ is the same as that of the last iteration of MTTF computation.

Step F: If $t \leq t_{ub}$, go to step B; otherwise, stop.

The variable definitions used for the MATLAB implementation of the method of the present invention are:

| | |
|---|---|
| pathset: | minimal path set matrix, P |
| cutset: | minimal cut set matrix |
| D: | The design matrix, D |
| reliab: | system reliability |
| simportnc: | vector of structural importance |
| rimportnc: | vector of reliability importance |
| alpha: | Shape parameter of the Weibull distribution |
| beta: | Scale parameter of the Weibull distribution |
| last_t: | $t_{ub}$ in the reliability calculation, the largest value of t at which the area under the exact reliability curve changes less than a very small amount |

The values of the variables for the MATLAB implementation of the method of the present invention for the series structure of FIG. 1 are:

$$pathset = \begin{matrix} 1 \\ 1 \end{matrix}$$

$$cutset = \begin{matrix} 1 & 0 \\ 0 & 1 \end{matrix}$$

$$D = \begin{matrix} 1 \\ 1 \end{matrix}$$

$simportnc = [\, 0.5 \quad 0.5\, ]'$ $rimportnc = [\, 0.95 \quad 0.95\, ]'$ $alpha = [\, 1.3 \quad 1.5\, ]'$ $beta = [\, 1 \quad 1\, ]'$ $last\_t = 2.25$ It will be appreciated by those of skill in the art that not all of these variables are required for determination of the system reliability according to the present invention. Only the variables pathset (the minimum path set matrix) and comprel (component reliability) are required. The design matrix D can be calculated in a program rather than input as a matrix to the program.

Figure 2:
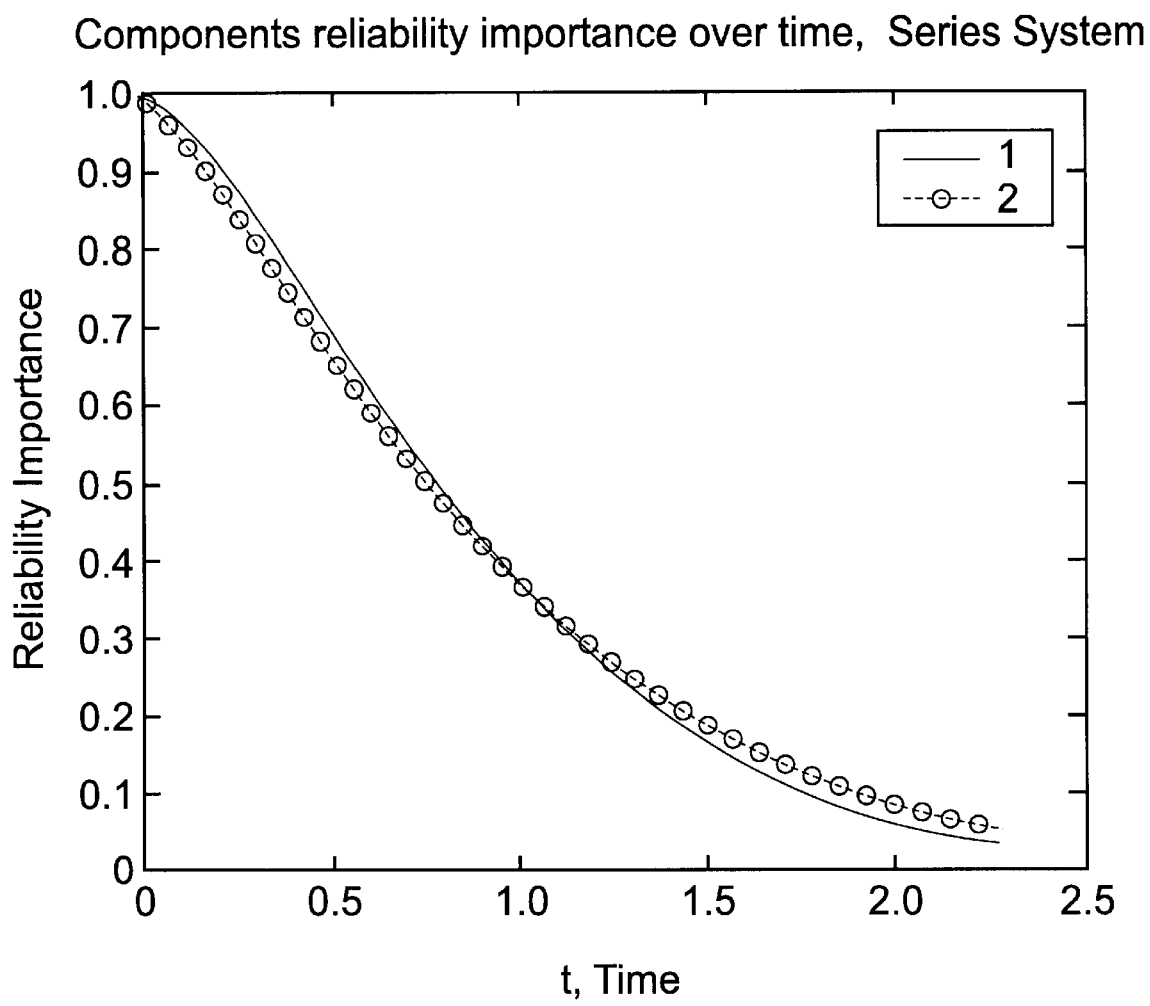
FIG. 2 shows a graph of reliability importance as a function of time for the components of the series structure of FIG. 1.

FIG. 2 shows a graph of reliability importance as a function of time for the components of the series structure of FIG. 1. The slight difference between the two reliability importance functions is due to the different values of α, the shape parameter of the Weibull distribution. Table 1 (below) lists the values of exact system reliability and its various bounds at several time points.

TABLE 1

Comparison of the exact system reliability, Chaudhuri bound, B–P, and Min–max bounds.

| Time t | Exact reliability | Min bound | Max bound | Chaudhuri bound | B–P bound |
|---|---|---|---|---|---|
| 0.0000 | 1.0000 | 1.0000 | 1.0000 | 1.0000 | 1.0000 |
| 0.1125 | 0.9083 | 0.9083 | 0.9433 | 0.8370 | 1.0000 |
| 0.2250 | 0.7784 | 0.7784 | 0.8660 | 0.7005 | 1.0000 |
| 0.3375 | 0.6442 | 0.6442 | 0.7838 | 0.5863 | 1.0000 |
| 0.4500 | 0.5189 | 0.5189 | 0.7018 | 0.4907 | 1.0000 |
| 0.5625 | 0.4085 | 0.4085 | 0.6229 | 0.4107 | 0.9348 |
| 0.6750 | 0.3152 | 0.3152 | 0.5489 | 0.3438 | 0.6643 |
| 0.7875 | 0.2389 | 0.2389 | 0.4804 | 0.2877 | 0.4724 |
| 0.9000 | 0.1780 | 0.1780 | 0.4181 | 0.2408 | 0.3451 |
| 1.0125 | 0.1307 | 0.1307 | 0.3610 | 0.2015 | 0.2574 |
| 1.1250 | 0.0945 | 0.0945 | 0.3032 | 0.1687 | 0.1950 |

TABLE 1-continued

Comparison of the exact system reliability, Chaudhuri bound, B–P, and Min–max bounds.

| Time t | Exact reliability | Min bound | Max bound | Chaudhuri bound | B–P bound |
|---|---|---|---|---|---|
| 1.2375 | 0.0675 | 0.0675 | 0.2524 | 0.1412 | 0.1497 |
| 1.3500 | 0.0476 | 0.0476 | 0.2083 | 0.1182 | 0.1160 |
| 1.4625 | 0.0331 | 0.0331 | 0.1706 | 0.0989 | 0.0907 |
| 1.5750 | 0.0228 | 0.0228 | 0.1385 | 0.0828 | 0.0714 |
| 1.6875 | 0.0155 | 0.0155 | 0.1117 | 0.0693 | 0.0565 |
| 1.8000 | 0.0104 | 0.0104 | 0.0894 | 0.0580 | 0.0449 |
| 1.9125 | 0.0070 | 0.0070 | 0.0710 | 0.0485 | 0.0359 |
| 2.0250 | 0.0046 | 0.0046 | 0.0560 | 0.0406 | 0.0287 |
| 2.1375 | 0.0030 | 0.0030 | 0.0439 | 0.0340 | 0.0231 |
| 2.2500 | 0.0019 | 0.0019 | 0.0342 | 0.0285 | 0.0186 |

Figure 3:
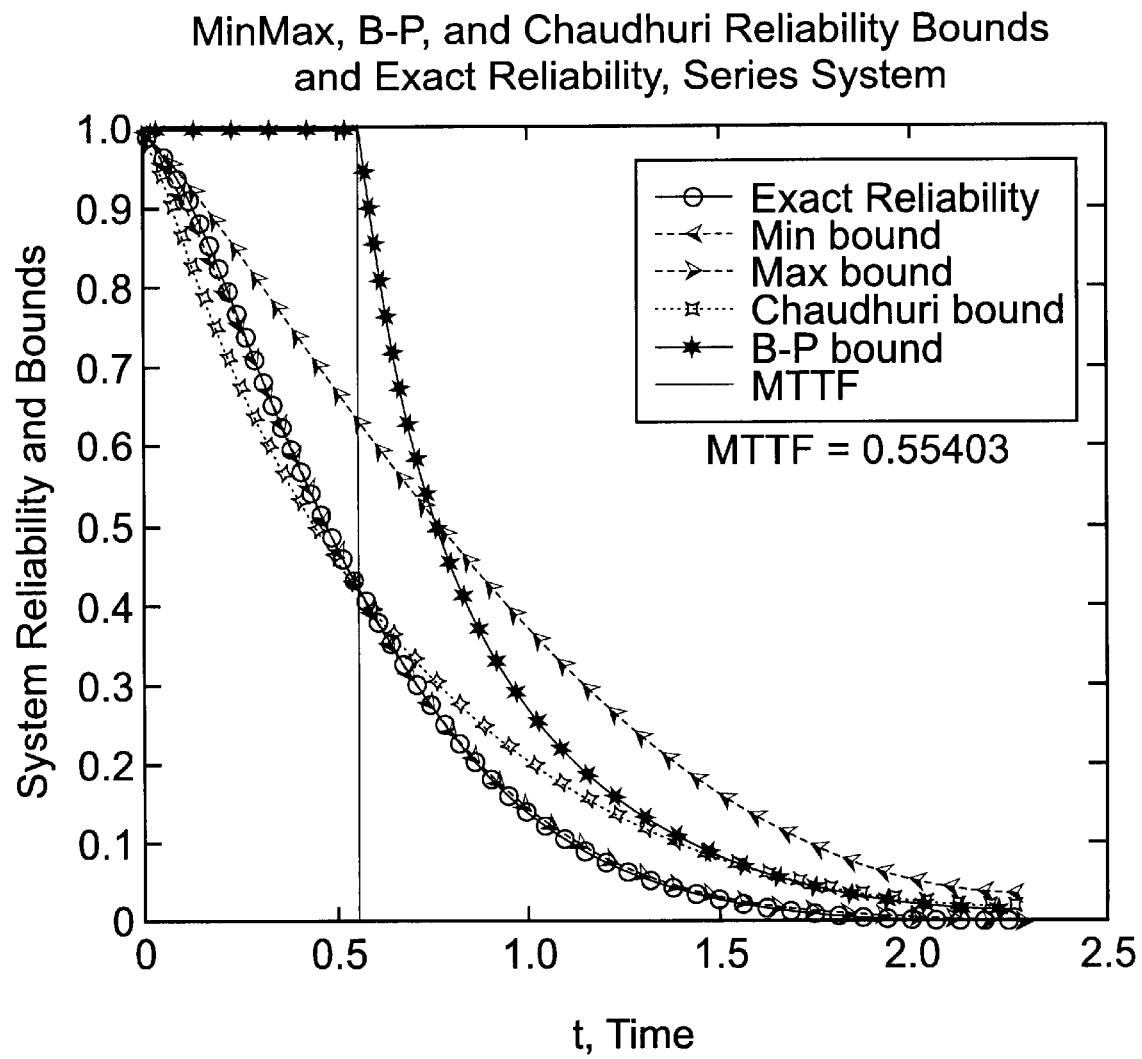
FIG. 3 shows a graph comparing the exact reliability (i.e., the reliability predicted according to the method of the present invention), and the Min-max bounds, B-P bounds, and Chaudhuri bounds of reliability as a function of time for the structure of FIG. 1.

FIG. 3 compares the exact reliability function, Min-max bounds, B-P bound, and Chaudhuri bounds as a function of time for the series system of FIG. 1. As shown in FIG. 3, in the case of series structure, the lower bound of Min-Max is the same as the exact reliability.

Example 2

Parallel System

Figure 4:
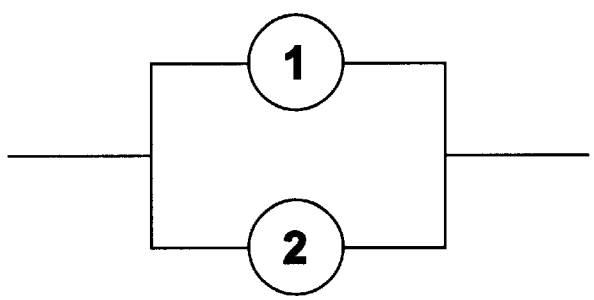
FIG. 4 shows a block diagram of a parallel structure that can be analyzed according to the method of the present invention.

Referring now to FIG. 4, there is shown a block diagram of a parallel structure that can be analyzed according to the method of the present invention. Consider the parallel structure with two independent Weibull components as shown in FIG. 4 having survival functions $$\exp\left(-\frac{t^{\alpha_i}}{\beta_i}\right),$$

i=1,2. The structure function of the system is given by $$\Phi(\underline{x}) = x_1 + x_2 - x_1 x_2 \quad (4.2)$$

The system has the following minimal path sets:

$\{1\}, \{2\}$

Step 1: Thus, The P matrix is:

$$P = \begin{pmatrix} 1 & 0 \\ 0 & 1 \end{pmatrix}_{2\times 2}$$

Step 2:

$$D = \begin{pmatrix} 1 & 0 & 1 \\ 0 & 1 & 1 \end{pmatrix}$$

Step 3: Since P has only two columns, D above results.
Step 4: Not necessary in this case.
Step 5:

$\underline{1} = [\, 1 \quad 1 \quad -1\, ]'$

Step 6:

$$\Phi(\underset{\sim}{x}) = \sum_{j=1}^{3} \underset{\sim}{1}(j) \prod_{i=1}^{2} x_i^{D(i,j)} =$$

$$\underset{\sim}{1}(1)x_1^{D(1,1)}x_2^{D(2,1)} + \underset{\sim}{1}(2)x_1^{D(1,2)}x_2^{D(2,2)} + \underset{\sim}{1}(3)x_1^{D(1,3)}x_2^{D(2,3)}$$

$$\Phi(\underset{\sim}{x}) = 1x_1^1 x_2^0 + 1x_1^0 x_2^1 + (-1)x_1^1 x_2^1 = x_1 + x_2 - x_1 x_2$$

which agrees with known structure function for the parallel structure set forth above.

The values of the variables used for the MATLAB implementation of the method of the present invention for the parallel structure of FIG. 4 are:

$$pathset = \begin{matrix} 1 & 0 \\ 0 & 1 \end{matrix}$$

$$cutset = \begin{matrix} 1 \\ 1 \end{matrix}$$

$$D = \begin{matrix} 1 & 0 & 1 \\ 0 & 1 & 1 \end{matrix}$$

Figure 5:
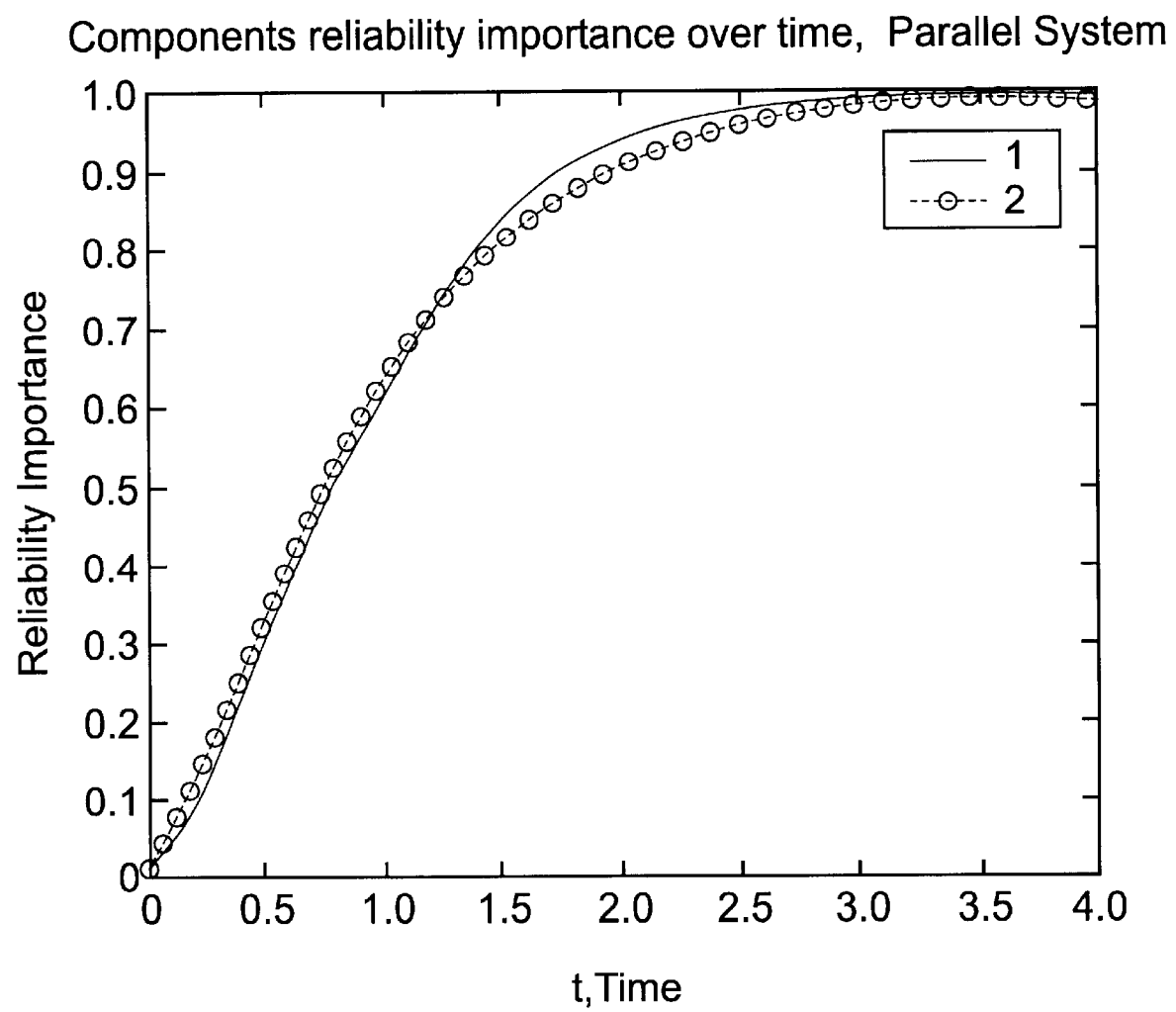
FIG. 5 shows a graph of the reliability importance as a function of time for the components of the parallel structure of FIG. 4.

$simportnc = [\,0.5\quad 0.5\,]'$ $rimportnc = [\,0.05\quad 0.05\,]'$ $alpha = [\,1.3\quad 1.5\,]'$ $beta = [\,1\quad 1\,]'$ $last\_t = 4$ FIG. 5 shows a graph of the reliability importance as a function of time for the components of the parallel structure of FIG. 4. Table 2 lists the values of the exact reliability and its various bounds at several time points.

TABLE 2

Comparison of the exact system reliability, Chaudhuri bound, B–P, and Min–max bounds.

| Time t | Exact reliability | Min bound | Max bound | Chaudhuri bound | B–P bound |
|---|---|---|---|---|---|
| 0.0000 | 1.0000 | 1.0000 | 1.0000 | 1.0000 | 1.0000 |
| 0.2000 | 0.9901 | 0.9144 | 0.9901 | 0.9610 | 1.0000 |
| 0.4000 | 0.9414 | 0.7765 | 0.9414 | 0.8732 | 1.0000 |
| 0.6000 | 0.8504 | 0.6283 | 0.8504 | 0.7664 | 1.0000 |
| 0.8000 | 0.7308 | 0.4889 | 0.7308 | 0.6574 | 1.0000 |
| 1.0000 | 0.6004 | 0.3679 | 0.6004 | 0.5548 | 1.0000 |
| 1.2000 | 0.4745 | 0.2815 | 0.4745 | 0.4628 | 1.0000 |
| 1.4000 | 0.3628 | 0.2125 | 0.3628 | 0.3827 | 0.8161 |
| 1.6000 | 0.2697 | 0.1585 | 0.2697 | 0.3144 | 0.6186 |
| 1.8000 | 0.1958 | 0.1168 | 0.1958 | 0.2570 | 0.4760 |
| 2.0000 | 0.1393 | 0.0852 | 0.1393 | 0.2093 | 0.3723 |
| 2.2000 | 0.0975 | 0.0616 | 0.0975 | 0.1699 | 0.2950 |
| 2.4000 | 0.0673 | 0.0441 | 0.0673 | 0.1376 | 0.2363 |
| 2.6000 | 0.0460 | 0.0313 | 0.0460 | 0.1113 | 0.1910 |
| 2.8000 | 0.0311 | 0.0221 | 0.0311 | 0.0898 | 0.1555 |
| 3.0000 | 0.0209 | 0.0154 | 0.0209 | 0.0725 | 0.1274 |
| 3.2000 | 0.0139 | 0.0107 | 0.0139 | 0.0584 | 0.1050 |
| 3.4000 | 0.0093 | 0.0074 | 0.0093 | 0.0470 | 0.0869 |
| 3.6000 | 0.0061 | 0.0051 | 0.0061 | 0.0378 | 0.0722 |
| 3.8000 | 0.0040 | 0.0034 | 0.0040 | 0.0304 | 0.0602 |
| 4.0000 | 0.0027 | 0.0023 | 0.0027 | 0.0245 | 0.0503 |

Figure 6:
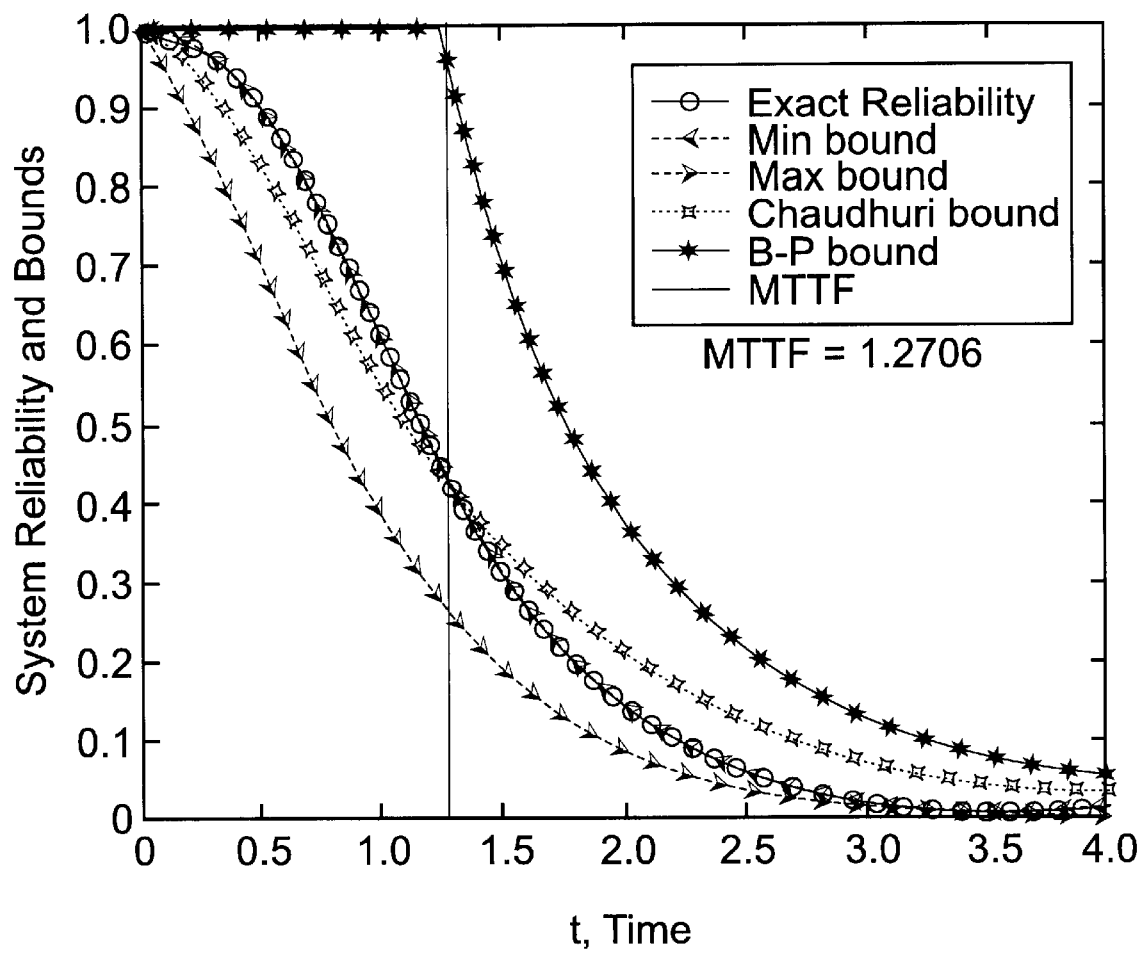
FIG. 6 shows a graph comparing the exact reliability, Min-max bounds, B-P bounds, and Chaudhuri bounds as a function of time for the structure of FIG. 4.

FIG. 6 compares different bounds with respect to the exact reliability for the parallel system of FIG. 4. In the case of the parallel structure, the upper bound of Min-Max is the same as the exact reliability.

Example 3

2-out-of-3 System

Figure 7:
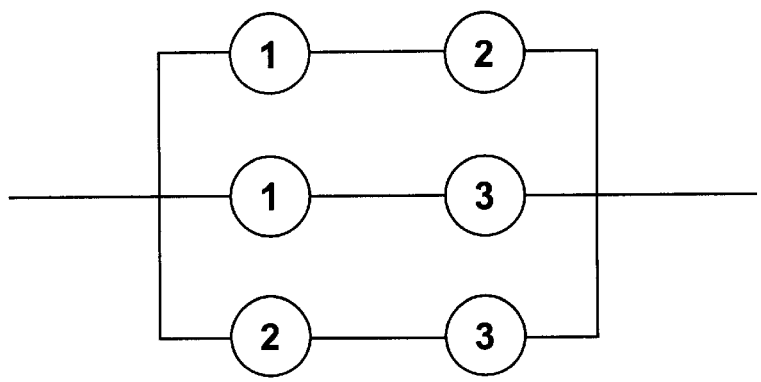
FIG. 7 shows a block diagram of a 2-out-of-3 structure that can be analyzed according to the method of the present invention.

Referring now to FIG. 7, there is shown a block diagram of a 2-out-of-3 structure that can be analyzed according to the method of the present invention. Consider the 2-out-of-3 structure with three independent Weibull components shown in FIG. 7 having survival functions $$\exp\left(-\frac{t^{\alpha_i}}{\beta_i}\right),\ i = 1, 2, 3.$$

The structure function of the system is given by $$\Phi(\underset{\sim}{x}) = x_1 x_2 + x_1 x_3 + x_2 x_3 - 2x_1 x_2 x_3 \qquad (4.3)$$

The system has the following minimal path sets:

$\{1,2\}, \{1,3\}, \{2,3\}$

Step 1: Thus, The P matrix is:

$$P = \begin{pmatrix} 1 & 1 & 0 \\ 1 & 0 & 1 \\ 0 & 1 & 1 \end{pmatrix}_{3\times 3}$$

Step 2 through 4: The final D matrix is:

$$D = \begin{pmatrix} 1 & 1 & 0 & 1 & 1 & 1 & 1 \\ 1 & 0 & 1 & 1 & 1 & 1 & 1 \\ 0 & 1 & 1 & 1 & 1 & 1 & 1 \end{pmatrix}$$

Step 5: The vector of ones is:

$$\underset{\sim}{1} = [\,1\quad 1\quad 1\quad -1\quad -1\quad -1\quad 1\,]'$$

Step 6: The structure function is:

$$\Phi(\underset{\sim}{x}) = 1x_1^1 x_2^1 x_3^0 + 1x_1^1 x_2^0 x_3^1 + 1x_1^0 x_2^1 x_3^1 - 1x_1^1 x_2^1 x_3^1 - 1x_1^1 x_2^1 x_3^1 -$$

$$1x_1^1 x_2^1 x_3^1 + 1x_1^1 x_2^1 x_3^1$$

$$= x_1 x_2 + x_1 x_3 + x_2 x_3 - 2x_1 x_2 x_3$$

which agrees with known structure function identified above.

The values of the variables for the MATLAB implementation of the method of the present invention for the 2-out-of-3 systems of FIG. 7 are:

$$pathset = \begin{matrix} 1 & 1 & 0 \\ 1 & 0 & 1 \\ 0 & 1 & 1 \end{matrix}$$

$$cutset = \begin{matrix} 1 & 1 & 0 \\ 1 & 0 & 1 \\ 0 & 1 & 1 \end{matrix}$$

-continued $$D = \begin{pmatrix} 1 & 1 & 0 & 1 & 1 & 1 & 1 \\ 1 & 0 & 1 & 1 & 1 & 1 & 1 \\ 0 & 1 & 1 & 1 & 1 & 1 & 1 \end{pmatrix}$$

Figure 8:
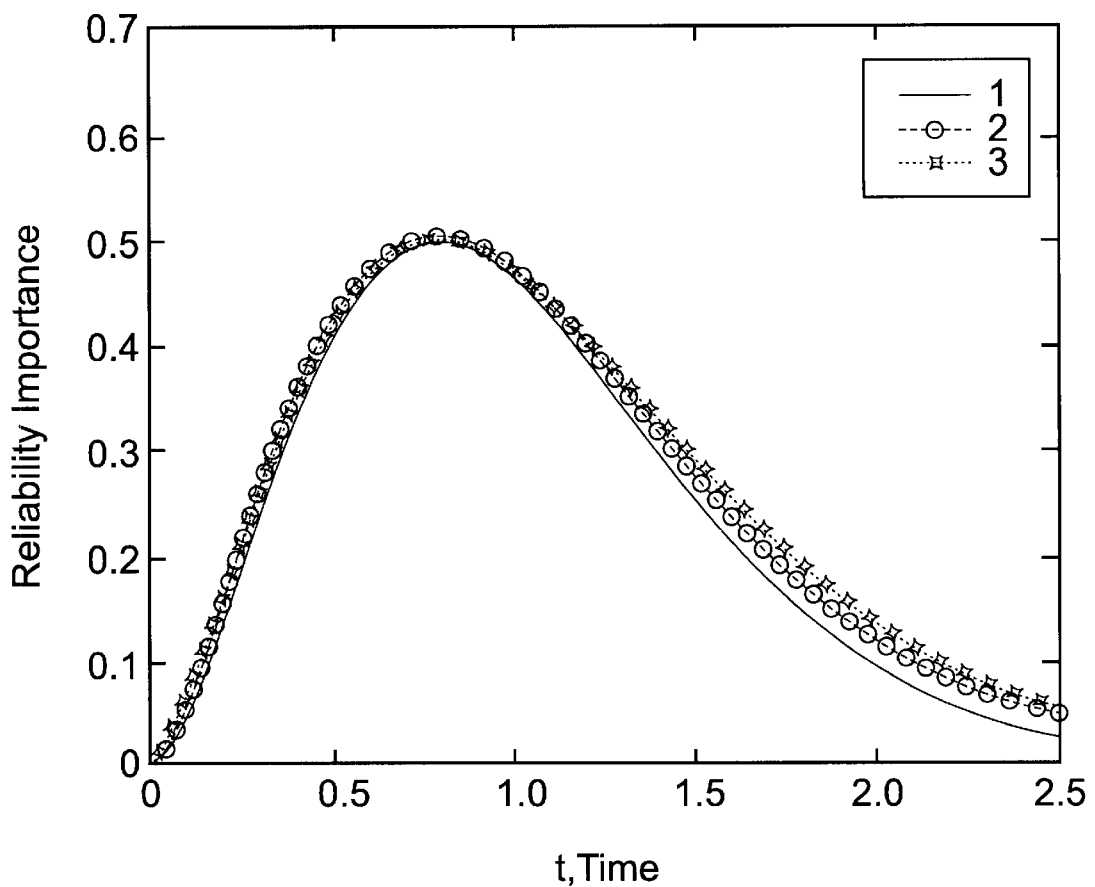
FIG. 8 shows a graph of the reliability importance as a function of time for the components of the 2-out-of-3 structure of FIG. 7.

$simportnc = [\,0.5 \quad 0.5 \quad 0.5\,]'$ $rimportnc = [\,0.095 \quad 0.095 \quad 0.095\,]'$ $alpha = [\,1.3 \quad 1.5 \quad 1.7\,]'$ $beta = [\,1 \quad 1 \quad 1\,]'$ $last\_t = 2.5$ FIG. 8 shows a graph of the reliability importance as a function of time for the components of the 2-out-of-3 system of FIG. 7. Table 3 below lists the values of the exact reliability and its various bounds at several points in time.

TABLE 3

Comparison of the exact system reliability, Chaudhuri bound, B–P, and Min–max bounds.

| Time t | Exact reliability | Min bound | Max bound | Chaudhuri bound | B–P bound |
|---|---|---|---|---|---|
| 0.0000 | 1.0000 | 1.0000 | 1.0000 | 1.0000 | 1.0000 |
| 0.1250 | 0.9943 | 0.9293 | 0.9972 | 0.9675 | 1.0000 |
| 0.2500 | 0.9610 | 0.8027 | 0.9821 | 0.8916 | 1.0000 |
| 0.3750 | 0.8900 | 0.6581 | 0.9500 | 0.7958 | 1.0000 |
| 0.5000 | 0.7859 | 0.5162 | 0.9006 | 0.6945 | 1.0000 |
| 0.6250 | 0.6620 | 0.3891 | 0.8367 | 0.5960 | 1.0000 |
| 0.7500 | 0.5332 | 0.2829 | 0.7624 | 0.5050 | 1.0000 |
| 0.8750 | 0.4120 | 0.1988 | 0.6822 | 0.4237 | 0.8994 |
| 1.0000 | 0.3064 | 0.1353 | 0.6004 | 0.3526 | 0.6936 |
| 1.1250 | 0.2201 | 0.0945 | 0.5086 | 0.2915 | 0.5367 |
| 1.2500 | 0.1531 | 0.0650 | 0.4218 | 0.2397 | 0.4221 |
| 1.3750 | 0.1034 | 0.0439 | 0.3430 | 0.1963 | 0.3364 |
| 1.5000 | 0.0681 | 0.0293 | 0.2739 | 0.1601 | 0.2710 |
| 1.6250 | 0.0437 | 0.0192 | 0.2152 | 0.1301 | 0.2203 |
| 1.7500 | 0.0275 | 0.0125 | 0.1664 | 0.1055 | 0.1804 |
| 1.8750 | 0.0169 | 0.0080 | 0.1270 | 0.0854 | 0.1487 |
| 2.0000 | 0.0102 | 0.0050 | 0.0956 | 0.0689 | 0.1232 |
| 2.1250 | 0.0061 | 0.0031 | 0.0712 | 0.0555 | 0.1026 |
| 2.2500 | 0.0036 | 0.0019 | 0.0525 | 0.0447 | 0.0858 |
| 2.3750 | 0.0021 | 0.0012 | 0.0383 | 0.0359 | 0.0720 |
| 2.5000 | 0.0012 | 0.0007 | 0.0277 | 0.0288 | 0.0606 |

Figure 9:
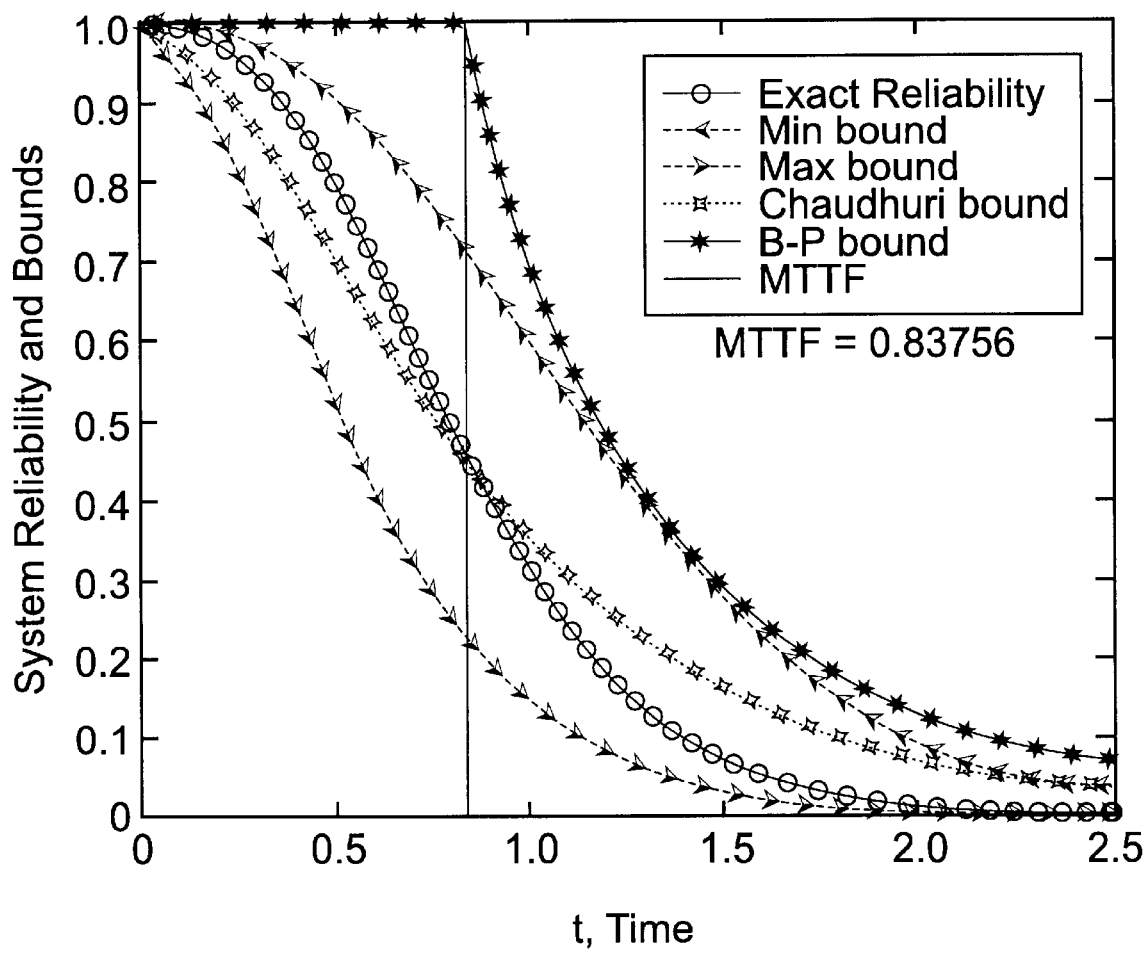
FIG. 9 shows a graph comparing the exact reliability, Min-max bounds, B-P bounds, and Chaudhuri bounds as a function of time for the structure of FIG. 7.

FIG. 9 compares different bounds with respect to the exact reliability for the 2-out-of-3 system of FIG. 7. At the MTTF, the Chauduri bound and exact reliability are the same for the 2-out-of-3 system.

Example 4

Bridge System

Figure 10:
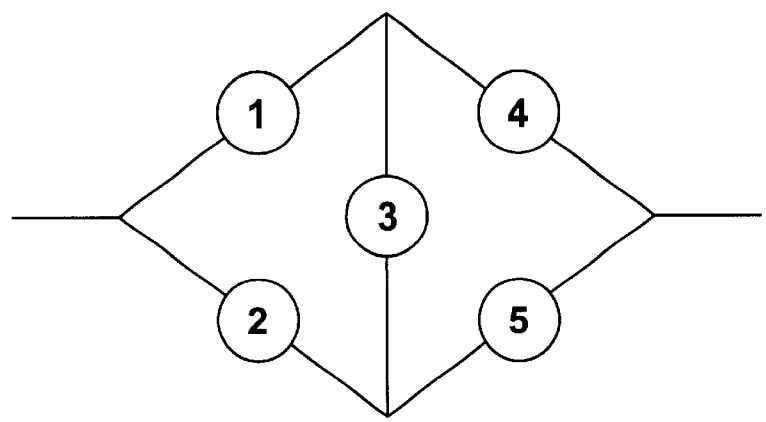
FIG. 10 shows a block diagram of a bridge system that can be analyzed according to the method of the present invention.

Referring now to FIG. 10, there is shown a block diagram of a bridge system that can be analyzed according to the method of the present invention. Consider the bridge structure with five independent Weibull components shown in FIG. 10 having survival functions $$\exp\left(-\frac{t^{\rho_i}}{\beta_i}\right),$$

i=1, ... ,5. The structure function of the system is given by $$\Phi(x) = x_1x_4 + x_2x_5 + x_1x_3x_5 + x_2x_3x_4 - x_1x_2x_4x_5 - \quad (4.4)$$

$$x_1x_3x_4x_5 - x_1x_2x_3x_4 - x_1x_2x_3x_5 - x_2x_3x_4x_5 + 2x_1x_2x_3x_4x_5$$

The system has the following minimal path sets:

{1,4}, {2,5}, {1,3,5}, {2,3,4}

Step 1: Thus, The P matrix is:

$$P = \begin{pmatrix} 1 & 0 & 1 & 0 \\ 0 & 1 & 0 & 1 \\ 0 & 0 & 1 & 1 \\ 1 & 0 & 0 & 1 \\ 0 & 1 & 1 & 0 \end{pmatrix}_{5 \times 4}$$

Step 2 through 4: The D matrix is:

$$D = \begin{pmatrix} 1 & 0 & 1 & 0 & 1 & 1 & 1 & 0 & 1 & 1 & 1 & 1 & 1 \\ 0 & 1 & 0 & 1 & 1 & 0 & 1 & 1 & 1 & 1 & 1 & 1 & 1 \\ 0 & 0 & 1 & 1 & 0 & 1 & 1 & 1 & 1 & 1 & 1 & 1 & 1 \\ 1 & 0 & 0 & 1 & 1 & 1 & 0 & 1 & 1 & 1 & 1 & 1 & 1 \\ 0 & 1 & 1 & 0 & 1 & 1 & 0 & 1 & 1 & 1 & 1 & 1 & 1 \end{pmatrix}$$

Step 5: The vector of ones is:

$$\underline{1} = [\,1 \quad 1 \quad 1 \quad -1 \quad -1 \quad -1 \quad -1 \quad -1 \quad -1 \quad 1 \quad 1 \quad 1 \quad -1\,]'$$

Step 6: The structure function is:

$$\Phi(x) = 1x_1^1x_2^0x_3^0x_4^1x_5^0 + 1x_1^0x_2^1x_3^0x_4^0x_5^1 + 1x_1^1x_2^0x_3^1x_4^0x_5^1 +$$

$$1x_1^0x_2^1x_3^1x_4^1x_5^0 - 1x_1^1x_2^1x_3^0x_4^1x_5^1 - 1x_1^1x_2^0x_3^1x_4^1x_5^1 - 1x_1^1x_2^1x_3^1x_4^1x_5^0 -$$

$$1x_1^1x_2^1x_3^1x_4^0x_5^1 - 1x_1^0x_2^1x_3^1x_4^1x_5^1 - 1x_1^1x_2^1x_3^1x_4^1x_5^1 + 1x_1^1x_2^1x_3^1x_4^1x_5^1 +$$

$$1x_1^1x_2^1x_3^1x_4^1x_5^1 + 1x_1^1x_2^1x_3^1x_4^1x_5^1 + 1x_1^1x_2^1x_3^1x_4^1x_5^1 - 1x_1^1x_2^1x_3^1x_4^1x_5^1 =$$

$$x_1x_4 + x_2x_5 + x_1x_3x_5 + x_2x_3x_4 - x_1x_2x_4x_5 - x_1x_3x_4x_5 -$$

$$x_1x_2x_3x_4 - x_1x_2x_3x_5 - x_2x_3x_4x_5 + 2x_1x_2x_3x_4x_5$$

which agrees with known structure function for the bridge system set forth above.

The values of the MATLAB variables for the bridge system of FIG. 10 are:

$$pathset = \begin{matrix} 1 & 0 & 1 & 0 \\ 0 & 1 & 0 & 1 \\ 0 & 0 & 1 & 1 \\ 1 & 0 & 0 & 1 \\ 0 & 1 & 1 & 0 \end{matrix}$$

$$cutset = \begin{matrix} 1 & 0 & 1 & 0 \\ 1 & 0 & 0 & 1 \\ 0 & 0 & 1 & 1 \\ 0 & 1 & 0 & 1 \\ 0 & 1 & 1 & 0 \end{matrix}$$

D =

Columns 1 through 12

$$\begin{matrix} 1 & 0 & 1 & 0 & 1 & 1 & 1 & 0 & 1 & 1 & 1 \\ 0 & 1 & 0 & 1 & 1 & 0 & 1 & 1 & 1 & 1 & 1 \\ 0 & 0 & 1 & 1 & 0 & 1 & 1 & 1 & 1 & 1 & 1 \\ 1 & 0 & 0 & 1 & 1 & 1 & 0 & 1 & 1 & 1 & 1 \\ 0 & 1 & 1 & 0 & 1 & 1 & 0 & 1 & 1 & 1 & 1 \end{matrix}$$

-continued

Columns 13 through 15

1 1 1
1 1 1
1 1 1
1 1 1
1 1 1

Figure 11:
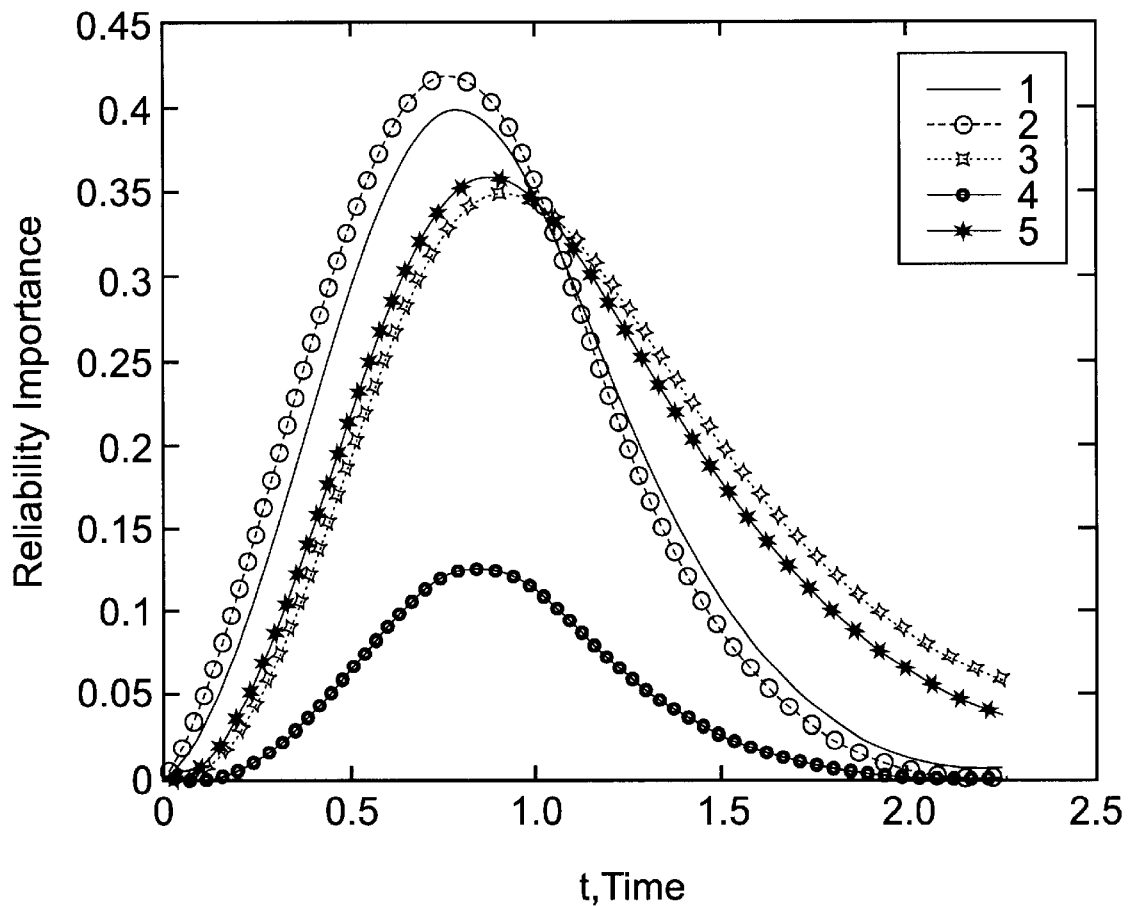
FIG. 11 shows a graph of the reliability importance as a function of time for the components of the bridge system of FIG. 10.

$simportnc = [\ 0.375\ \ 0.375\ \ 0.125\ \ 0.375\ \ 0.375\ ]'$ $rimportnc = [0.09321048\ 0.1038712\ 0.0104076\ 0.0651144$ $0.0756868]'$ $alpha = [\ 1.3\ \ 1.5\ \ 1.7\ \ 2.1\ \ 2.3\ ]'$ $beta = [\ 1\ \ 1\ \ 1\ \ 1\ \ 1\ ]'$ $last\_t = 2.25$ FIG. 11 shows a graph of the reliability importance as a function of time for the components of the bridge system of FIG. 10. Table 4 (below) lists the values of the exact reliability and its various bounds at several time points.

TABLE 4

Comparison of the exact system reliability,
Chaudhuri bound, B–P, and Min–max bounds.

| Time t | Exact reliability | Min bound | Max bound | Chaudhuri bound | B–P bound |
|---|---|---|---|---|---|
| 0.0000 | 1.0000 | 1.0000 | 1.0000 | 1.0000 | 1.0000 |
| 0.1125 | 0.9978 | 0.9567 | 0.9979 | 0.9813 | 1.0000 |
| 0.2250 | 0.9845 | 0.8702 | 0.9864 | 0.9299 | 1.0000 |
| 0.3375 | 0.9505 | 0.7571 | 0.9615 | 0.8559 | 1.0000 |
| 0.4500 | 0.8870 | 0.6305 | 0.9223 | 0.7693 | 1.0000 |
| 0.5625 | 0.7910 | 0.5025 | 0.8702 | 0.6784 | 1.0000 |
| 0.6750 | 0.6680 | 0.3831 | 0.8080 | 0.5893 | 1.0000 |
| 0.7875 | 0.5316 | 0.2791 | 0.7388 | 0.5055 | 1.0000 |
| 0.9000 | 0.3978 | 0.1942 | 0.6659 | 0.4294 | 0.8590 |
| 1.0125 | 0.2802 | 0.1297 | 0.5876 | 0.3619 | 0.6759 |
| 1.1250 | 0.1862 | 0.0866 | 0.4725 | 0.3030 | 0.5370 |
| 1.2375 | 0.1173 | 0.0559 | 0.3638 | 0.2524 | 0.4324 |
| 1.3500 | 0.0702 | 0.0349 | 0.2682 | 0.2094 | 0.3519 |
| 1.4625 | 0.0402 | 0.0210 | 0.1895 | 0.1731 | 0.2891 |
| 1.5750 | 0.0220 | 0.0123 | 0.1285 | 0.1427 | 0.2393 |
| 1.6875 | 0.0116 | 0.0069 | 0.0837 | 0.1174 | 0.1993 |
| 1.8000 | 0.0059 | 0.0038 | 0.0525 | 0.0965 | 0.1670 |
| 1.9125 | 0.0029 | 0.0020 | 0.0317 | 0.0792 | 0.1406 |
| 2.0250 | 0.0014 | 0.0010 | 0.0185 | 0.0649 | 0.1189 |
| 2.1375 | 0.0006 | 0.0005 | 0.0104 | 0.0532 | 0.1009 |
| 2.2500 | 0.0003 | 0.0002 | 0.0057 | 0.0435 | 0.0859 |

Figure 12:
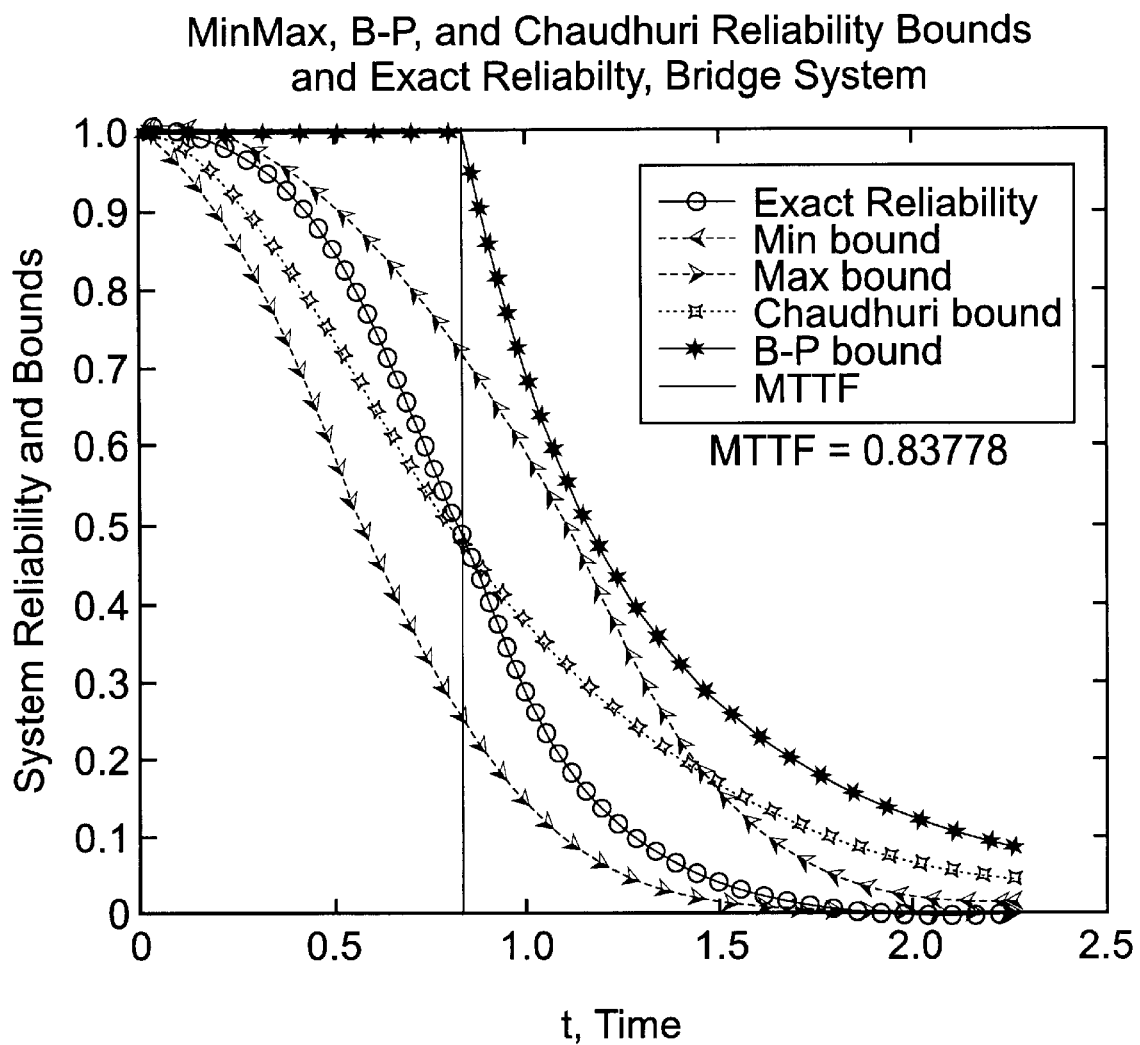
FIG. 12 shows a graph comparing the exact reliability, Min-max bounds, B-P bounds, and Chaudhuri bounds as a function of time for the bridge structure of FIG. 10.

FIG. 12 compares different bounds with respect to the exact reliability for the bridge system of FIG. 10. As with the 2-out-of-3 system, the Chaudhuri bound and the exact reliability are the same at the MTTF for the bridge system.

Example 5

Fire Detector System

Figure 13:
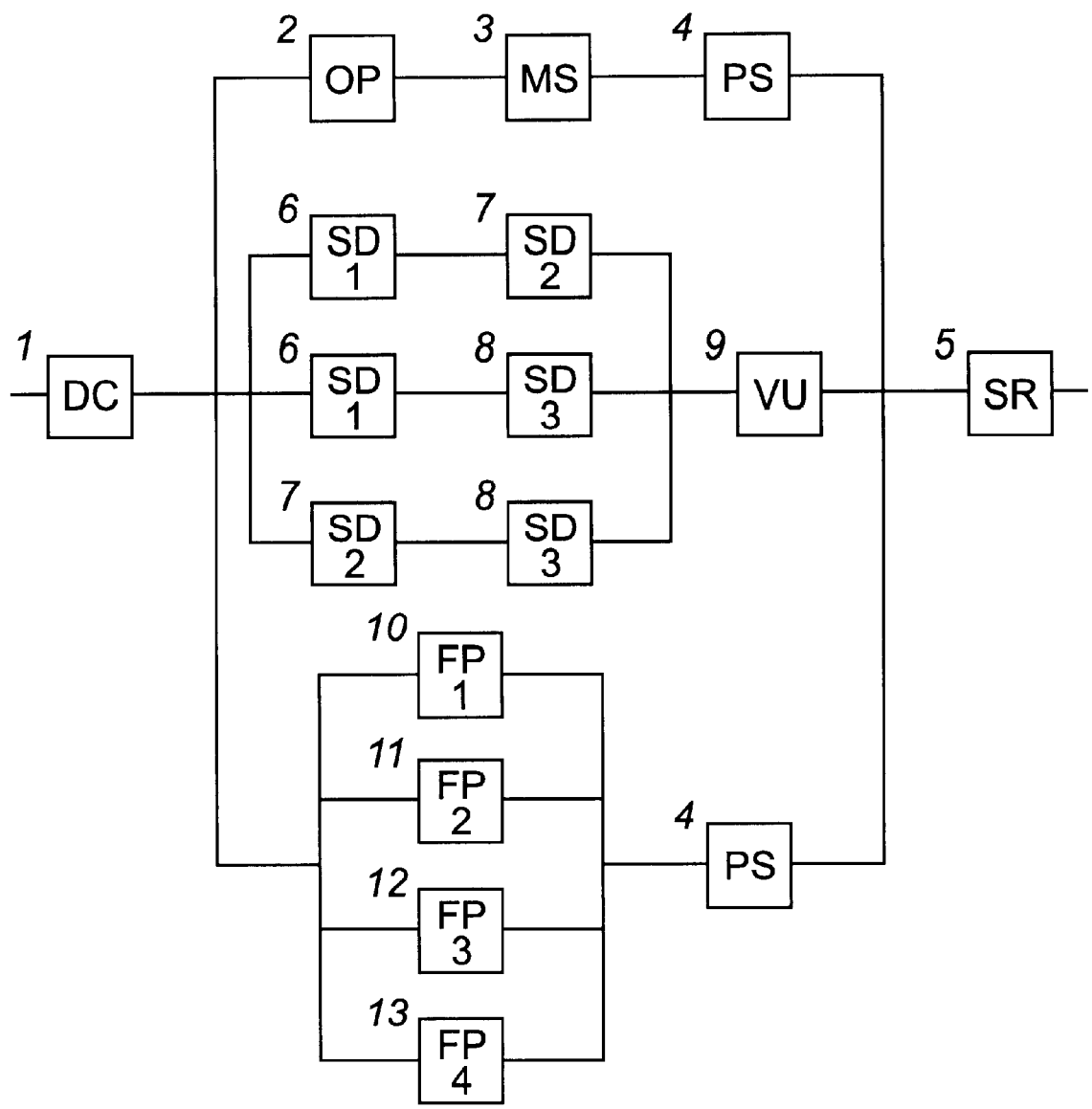
FIG. 13 shows a block diagram of a fire detector system that can be analyzed according to the method of the present invention.

Referring now to FIG. 13, there is shown a block diagram of a fire detector system that can be analyzed according to the method of the present invention. This pneumatic system is considered in Hoyland and Rausand at page 84. (Hoyland, A. and Rausand, M., *System Reliability Theory, Models and Statistical Methods*, Wiley, New York (1994).) The system consists of three parts: heat detection, smoke detection, and an alarm button operated manually. The reliability block diagram of the system is shown in FIG. 13.

In the heat detection section, there is a circuit with four identical fuse plugs, FP1, FP2, FP3, and FP4, which forces the air out of the circuit if they experience temperatures more than 72° C. The circuit is connected to a pressure switch (PS). The PS starts functioning once one or more of the plugs starts working and transmits a signal to the start relay (SR) to produce an alarm and thereby causing activation of a fire protection system.

The smoke detection section has three smoke detectors SD1, SD2, and SD3. These detectors are connected to a voting unit VU through a logical 2-out-of-3. This means that at least two detectors must give a fire signal before the fire alarm is activated.

For the successful transmission of an electric signal from heat detector/smoke detector, the DC source must be working.

In the manual activation section, a human operator OP must always be present to activate the system. If the operator observes a fire, he/she turns on the manual switch MS to relieve pressure in the circuit of the heat detection section. This activates the PS switch, which in turn gives an electric signal to SR. Of course, DC should be in the functioning state.

The system has the following 8 minimal path sets:

$\{1,2,3,4,5\}, \{1,6,7,9,5\}, \{1,6,8,9,5\}, \{1,7,8,9,5\}, \{1,10,4,5\},$
$\{1,11,4,5\}, \{1,12,4,5,\}, \{1,13,4,5\}$

Since the computation of this system is rather involved and lengthy, a partial printout is provided. For example, the D matrix for this system has $2^8-1=255$ columns.

The values of the variables for the MATLAB implementation of the method of the present invention for the fire detector system of FIG. 13 are:

$$pathset = \begin{matrix} 1 & 1 & 1 & 1 & 1 & 1 & 1 & 1 \\ 1 & 0 & 0 & 0 & 0 & 0 & 0 & 0 \\ 1 & 0 & 0 & 0 & 0 & 0 & 0 & 0 \\ 1 & 0 & 0 & 0 & 1 & 1 & 1 & 1 \\ 1 & 1 & 1 & 1 & 1 & 1 & 1 & 1 \\ 0 & 1 & 1 & 0 & 0 & 0 & 0 & 0 \\ 0 & 1 & 0 & 1 & 0 & 0 & 0 & 0 \\ 0 & 0 & 1 & 1 & 0 & 0 & 0 & 0 \\ 0 & 1 & 1 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{matrix}$$

-continued $$\text{cutset Columns 1 through 12} = \begin{matrix} 1 & 0 & 0 & 0 & 0 & 0 & 0 & 0 & 0 & 0 & 0 & 0 \\ 0 & 0 & 0 & 0 & 0 & 0 & 1 & 1 & 1 & 0 & 0 & 0 \\ 0 & 0 & 0 & 0 & 0 & 0 & 0 & 0 & 0 & 1 & 1 & 1 \\ 0 & 0 & 1 & 1 & 1 & 1 & 0 & 0 & 0 & 0 & 0 & 0 \\ 0 & 1 & 0 & 0 & 0 & 0 & 0 & 0 & 0 & 0 & 0 & 0 \\ 0 & 0 & 1 & 0 & 1 & 0 & 1 & 1 & 0 & 1 & 1 & 0 \\ 0 & 0 & 1 & 1 & 0 & 0 & 1 & 0 & 1 & 1 & 0 & 1 \\ 0 & 0 & 0 & 1 & 1 & 0 & 0 & 1 & 1 & 0 & 1 & 1 \\ 0 & 0 & 0 & 0 & 0 & 1 & 0 & 0 & 0 & 0 & 0 & 0 \\ 0 & 0 & 0 & 0 & 0 & 0 & 1 & 1 & 1 & 1 & 1 & 1 \\ 0 & 0 & 0 & 0 & 0 & 0 & 1 & 1 & 1 & 1 & 1 & 1 \\ 0 & 0 & 0 & 0 & 0 & 0 & 1 & 1 & 1 & 1 & 1 & 1 \\ 0 & 0 & 0 & 0 & 0 & 0 & 1 & 1 & 1 & 1 & 1 & 1 \end{matrix}$$

simportnc = [0.3037109375 0.0029296875 0.0029296875
0.787109375 0.3037109375 0.03271484375 0.03271484375
0.03271484375 0.0654296875 0.0087890625
(0.0087890625 0.0087890625 0.0087890625])' rimportnc = [0.81617055483750 0.00000604387862
0.00000597017279 0.11212102442168 0.77730529032143
0.02348713768035 0.02423116515824 0.02493497493462
0.10817190647499 0.00002250038183 0.00002475042002
(0.00002750046668 0.00003093802502])' alpha = [1.5 1.5 1.6 1.6 1.7 1.7 1.8 1.8 1.9 2.0 2.1 2.2 2.3]' beta = [1 1 1 1 1 1 1 1 1 1 1 1 1]' last_t = 2

Figure 14:
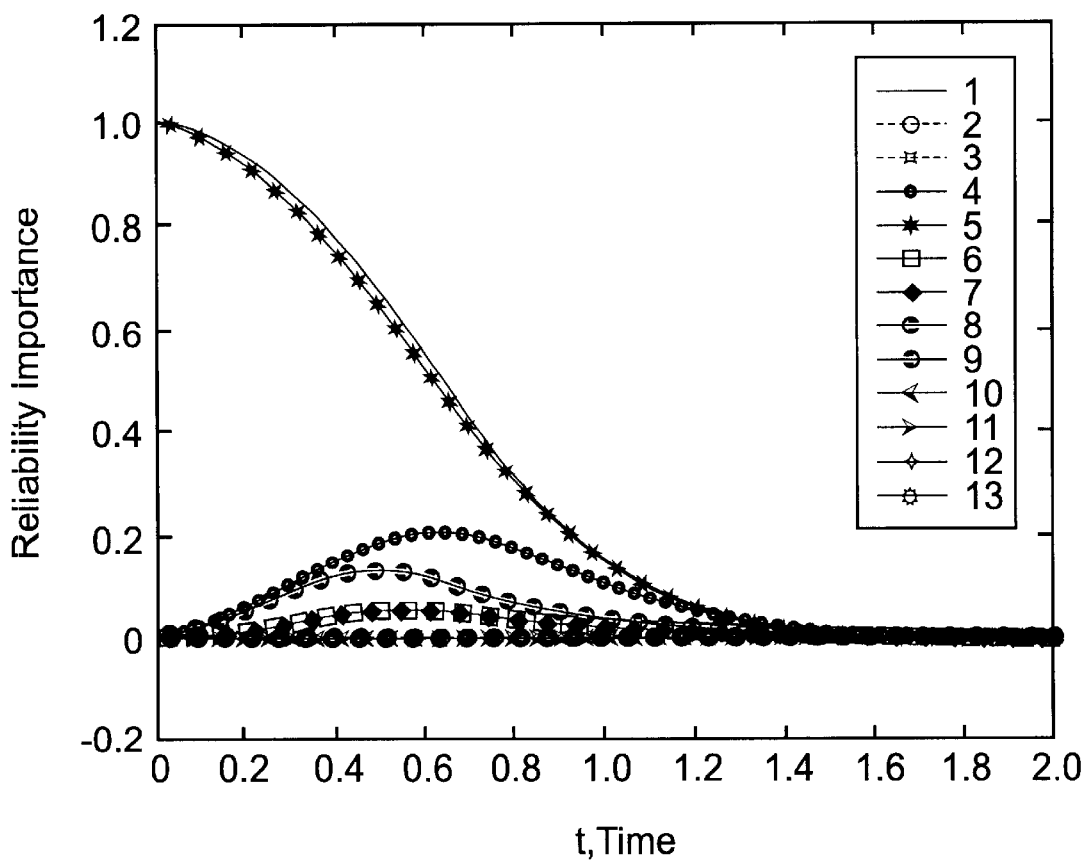
FIG. 14 shows a graph of the reliability importance as a function of time for the components of the fire detection system of FIG. 13.

FIG. 14 shows a graph of the reliability importance as a function of time for the components of the fire detection system of FIG. 13. Table 5 lists the values of the exact reliability and its various bounds at several points in time.

TABLE 5

Comparison of the exact system reliability,
Chaudhuri bound, B–P, and Min–max bounds.

| Time t | Exact reliability | Min bound | Max bound | Chaudhuri bound | B–P bound |
|---|---|---|---|---|---|
| 0.0000 | 1.0000 | 1.0000 | 1.0000 | 1.0000 | 1.0000 |
| 0.1000 | 0.9494 | 0.9215 | 0.9689 | 0.8723 | 1.0000 |
| 0.2000 | 0.8536 | 0.7748 | 0.9144 | 0.7543 | 1.0000 |
| 0.3000 | 0.7327 | 0.6054 | 0.8485 | 0.6464 | 1.0000 |
| 0.4000 | 0.5989 | 0.4422 | 0.7765 | 0.5491 | 1.0000 |
| 0.5000 | 0.4640 | 0.3029 | 0.7022 | 0.4628 | 1.0000 |
| 0.6000 | 0.3398 | 0.1950 | 0.6283 | 0.3872 | 0.6936 |
| 0.7000 | 0.2347 | 0.1181 | 0.5567 | 0.3219 | 0.4946 |
| 0.8000 | 0.1526 | 0.0673 | 0.4889 | 0.2662 | 0.3624 |
| 0.9000 | 0.0932 | 0.0362 | 0.4258 | 0.2189 | 0.2710 |
| 1.0000 | 0.0533 | 0.0183 | 0.3679 | 0.1793 | 0.2060 |
| 1.1000 | 0.0285 | 0.0091 | 0.3085 | 0.1462 | 0.1585 |
| 1.2000 | 0.0142 | 0.0043 | 0.2558 | 0.1189 | 0.1232 |
| 1.3000 | 0.0066 | 0.0019 | 0.2097 | 0.0963 | 0.0966 |
| 1.4000 | 0.0029 | 0.0008 | 0.1700 | 0.0778 | 0.0763 |
| 1.5000 | 0.0012 | 0.0003 | 0.1364 | 0.0627 | 0.0606 |
| 1.6000 | 0.0005 | 0.0001 | 0.1082 | 0.0504 | 0.0483 |
| 1.7000 | 0.0002 | 0.0000 | 0.0850 | 0.0404 | 0.0387 |
| 1.8000 | 0.0001 | 0.0000 | 0.0661 | 0.0324 | 0.0311 |
| 1.9000 | 0.0000 | 0.0000 | 0.0509 | 0.0259 | 0.0251 |
| 2.0000 | 0.0000 | 0.0000 | 0.0388 | 0.0207 | 0.0203 |

Figure 15:
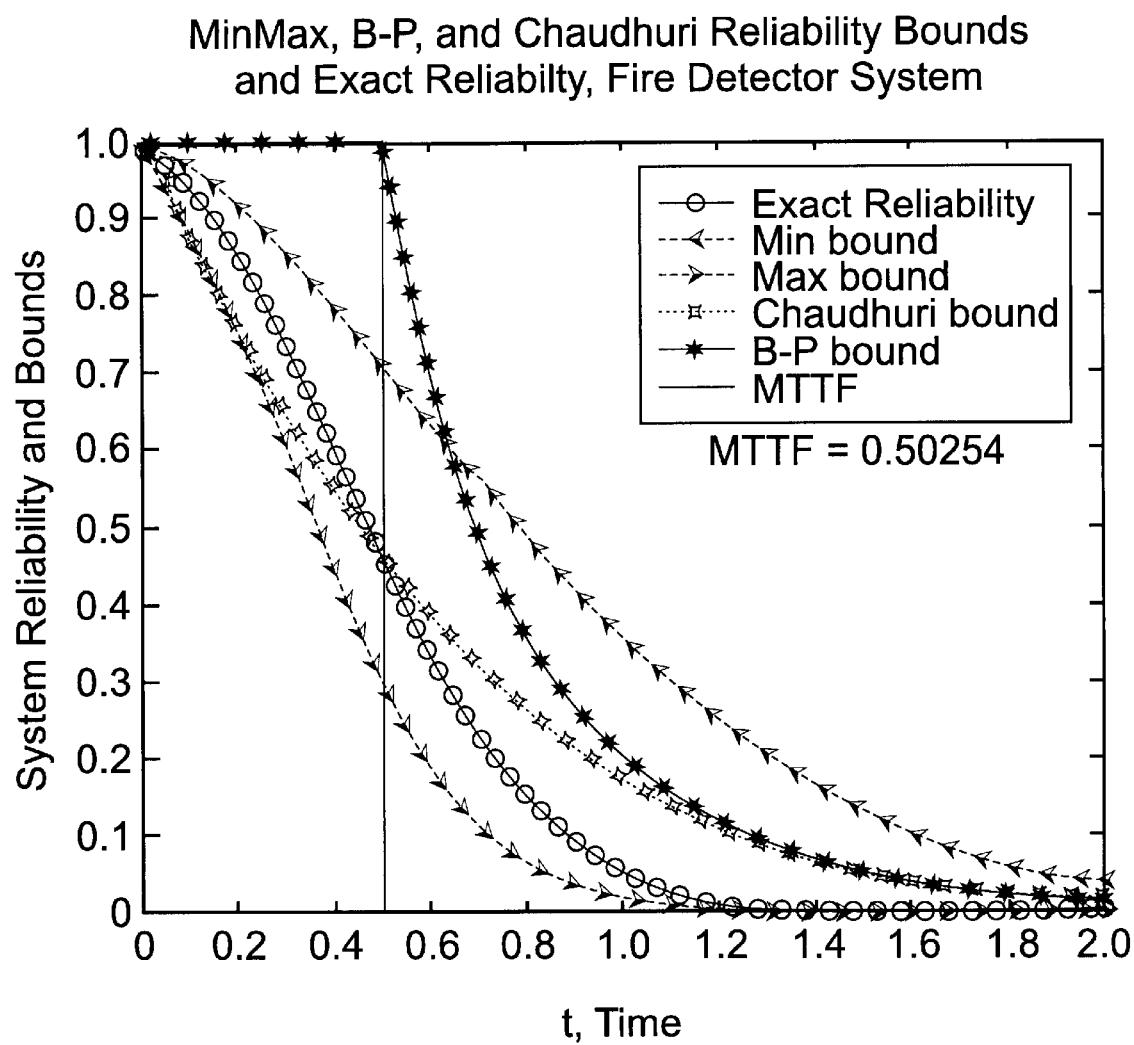
FIG. 15 shows a graph comparing the exact reliability, Min-max bounds, B-P bounds, and Chaudhuri bounds as a function of time for the fire detection system of FIG. 13.

FIG. 15 compares different bounds with respect to the exact reliability for the fire detection system of FIG. 13. As was true with the 2-out-of-3 and bridge systems, the value of the Chaudhuri bound and the exact system reliability are the same at the MTTF for the fire detection system.

4. THE APPARATUS OF THE PRESENT INVENTION

The method of the present invention is simple and easy to use. The method depends on the knowledge of the path sets of a given structure. Standard software packages are available (CAFTAN, Hoyland and Rausand (1994), p. 145) to provide the minimal path sets of any coherent system. The method of the present invention has been programmed in SAS, S-PLUS, and MATLAB. A MATLAB version of the code of one embodiment of the apparatus of the present invention is contained in Appendix A. This code can be executed on a personal computer of the type well known in the art. Input can be made to the system by a keyboard, scanner, or other input device well known in the art. The results can be output using a video display, LCD display, printer, or other output device well known in the art.

Figure 16:
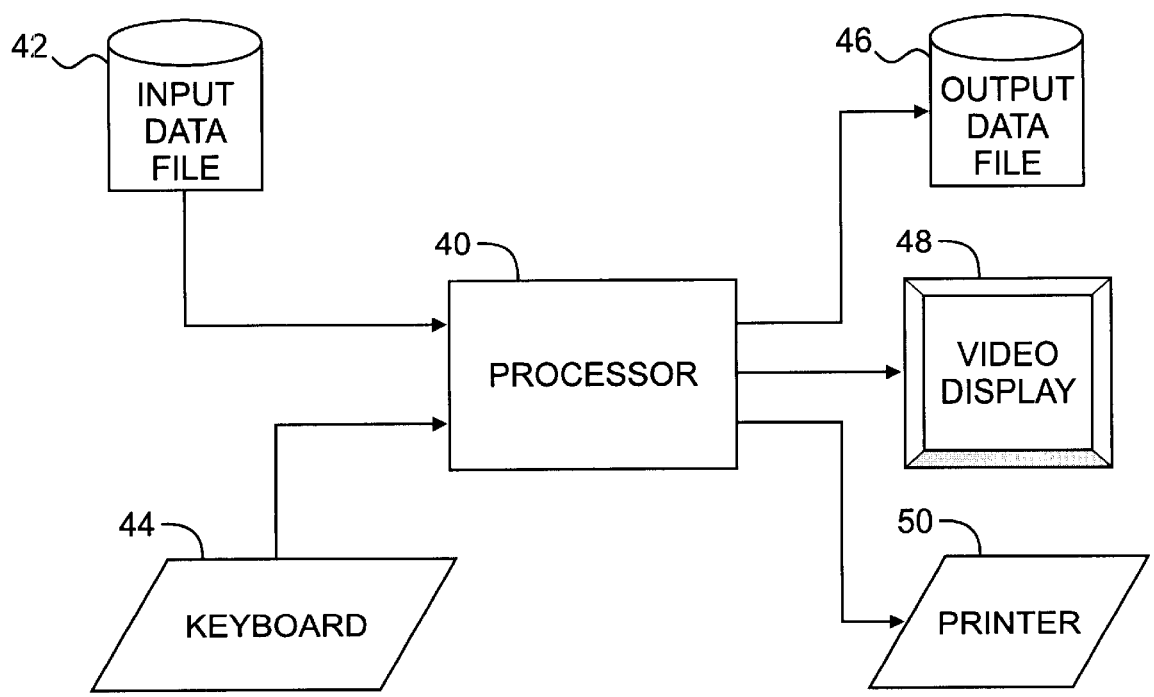
FIG. 16 shows a block diagram of one embodiment of the apparatus for predictions of system reliability according to the present invention.

A block diagram of a representative apparatus for practicing the method of the present invention is shown in FIG. 16. In this embodiment, processor 40 serves as a means for performing most of the calculations required as is explained in greater detail herein. Input data file 42 and keyboard 44 serve as input devices to processor 40, while output from processor 40 is sent to an output device such as output data file 46, video display 48, and/or printer 50.

Input data file 42 and/or keyboard 44 serve as means for inputting the minimal path sets and individual component reliability dater to processor 40. As previously mentioned, programs such as CAFTAN may be executed to generate minimal path set data that may be included in input data file 42 or made available to a user for manual input to processor 40 by keyboard 44. Alternately, the minimal path set data maybe determined manually or by another method well known in the art. Component reliability data may likewise be entered by an input device such as input data file 42 or keyboard 44.

During operation, minimal path set data and component reliability data is entered as described above and read by processor 40. Either processor 40 then calculates the total number of minimal path sets, or, alternatively, the total number of minimal path sets is input though an input device.

Processor 40 then serves as a means to construct the minimal path set matrix, a means to construct the design matrix, a means to construct the vector of ones, and the means to determine the system reliability as described in association with the above discussion of the method of the present invention. Processor 40 may also serve as a means for determining the structure function according to the method of the present invention.

Processor 40 then outputs the reliability and/or structure function device to one or more output devices operatively connected to processor 40. Shown in FIG. 16 are three such output devices—output data file 46, video display 48, and printer 50.

In the embodiment of FIG. 16, processor 40 comprises a personal computer having the Windows (™) operating system and running the MATLAB program attached hereto as Appendix A. Those of skill in the art will acknowledge that processor 40 may comprise various combinations of hardware and/or software as is well known in the art. For example, the MATLAB program could be embodied in hardware alone, other software programs could be used (including SAS and S-SPLUS or a program written in any

5. CONCLUSIONS

The method of the present invention yields a new representation of the structure function of a coherent system. This representation is useful in implementing Chaudhuri bounds, which are found to be advantageous when compared to the Min-max, Barlow and Proschan bounds on the system reliability most commonly used in practice. With the proposed representation of the structure function, the computations of important reliability measures such as Birnbaum's structural and reliability importance become easy. The method for predicting system reliability accurately calculates the reliability of even very complex systems without requiring burdensome calculations. The method is easy to implement and to use as exemplified by the apparatus of the present invention. Also, reliability is determined without dissection of the system into subsystems thereby avoiding the problem of introduced inaccuracies caused by joinder of such subsets. The method is not dependent upon selection of parameters which can adversely affect the result. Further, the exact system reliability is predicted—not bounds on reliability as is determined with prior art approaches.

When it is known that the components have IFRA life, then the Chaudhuri bounds could be the best choice for the purpose of predicting reliability of a very complex coherent structure. The knowledge of some quantile of the component distributions is enough to obtain the Chaudhuri bounds, whereas in order to implement Min-max bounds, the complete description of the component life distributions is required. The Barlow-Proschan bound is not valid for the significant part of the system life and above all this bound is point-wise. It's also clear from the above examples that the Chaudhuri bounds do fairly well for the useful part of the system life. Thus, the use of the Chaudhuri bounds is recommended for general use.

It will be appreciated by those of skill in the art that the method of the present invention results in a prediction of exact reliability, rather than the determination of upper and lower values. Thus, when accuracy and/or cost are critical, the present invention serves as a valuable tool for prediction of system reliability. It will be further appreciated that the method of the present invention is not dependent upon the selection of initial parameters thereby avoiding. inaccuracies resulting from the selection of such parameters. It will be still further appreciated that the method of the present invention does not require the system to be divided into sub-systems, thereby avoiding the inaccuracies resulting from the joinder of sub-reliabilities. It will be yet further appreciated that the present invention can be utilized to evaluate the reliability of complex systems while maintaining the advantages of being easy to implement and to use.

We claim:

1. A method for prediction of system reliability of a system having n components, wherein n is greater than one and each component has a reliability $p_i$ associated therewith, the system having identifiable minimal path sets and an identifiable total number of minimal path sets, the method comprising the steps of:
   (a) identifying the minimal path sets of the system and the total number of minimal path sets m;
   (b) constructing a minimal path set matrix of n×m dimension, where each element of the matrix is a 1 if the component represented belongs to the minimal path sets or is a zero otherwise;
   (c) constructing a design matrix, the design matrix comprising the minimal path set matrix if the total number of path sets is one, or if the total number of path sets is greater than one, the design matrix is constructed according to the following steps:
      (1) initializing a set size K to two where the set size represents a number of sets of columns of the minimal path set matrix,
      (2) selecting each set of size K all possible sets of size K, performing an OR operation on the rows of the selected set, and appending the ORed result as an additional column to the matrix,
      (3) repeating step (2) until all possible sets of size K have been selected,
      (4) incrementing the size of K by one, and
      (5) if the size K is not greater than m, repeating step (2);
   (d) constructing a vector of ones of dimension $2^m-1$ where the first m elements are "1"s, and each set of $$\binom{m}{i}$$

elements have the sign $(-1)^{i-1}$, where i ranges from 2 to m; and
   (e) determining the system reliability by $$h(\underline{p}) = \sum_{j=1}^{2^m-1} 1(j) \cdot \subseteq_{i=1}^{n} p_i^{D(i,j)} \quad 0 < p_i < 1$$

where D(i,j) is the (i,j)th element of the design matrix.

2. The method of claim 1, wherein each component has a state $x_i$: associated therewith, the method further comprising, after the completion of step (d), the step of determining the structure function by $$\Phi(\underline{x}) = \sum_{j=1}^{2^m-1} 1(j) \cdot \subseteq_{i=1}^{n} x_i^{D(i,j)},$$

where D(i,j) is the design matrix.

3. A method for determining the structure function of a system having n components, wherein n is greater than one and each component having a state $x_i$ associated therewith, the system having identifiable minimal path sets and an identifiable total number of minimal path sets, the method comprising the steps of:
   (a) identifying the minimal path sets of the system and the total number of minimal path sets m;
   (b) constructing a minimal path set matrix of n×m dimension, where each element of the matrix is a 1 if the component represented belongs to the minimal path sets or is a zero otherwise;
   (c) constructing a design matrix, the design matrix comprising the minimal path set matrix if the total number of path sets is one, or if the total number of path sets is greater than one, the design matrix is constructed according to the following steps:
      (1) initializing a set size K to two where the set size represents a number of sets of columns of the minimal path set matrix,
      (2) selecting each set of size K all possible sets of size K, performing an OR operation on the rows of the selected set, and appending the Ored result as an additional column to the matrix,
      (3) repeating step (2) until all possible sets of size K have been selected,
      (4) incrementing the size of K by one, and
      (5) if the size K is not greater than m, repeating step (2);

(d) constructing a vector of ones of dimension $2^m-1$ where the first m elements are "1"s, and each set of $$\binom{m}{i}$$

elements have the sign $(-1)^{i-1}$, where i ranges from 2 to m; and (e) determining the structure function by $$\Phi(\underline{x}) = \sum_{j=1}^{2^m-1} 1(j) \cdot \bigcap_{i=1}^{n} x_i^{D(i,j)}$$

where D(i,j) is the (i,j)th element of the design matrix.

4. An apparatus for prediction of the reliability of a system, the system comprising n components, wherein n is greater than one and each component has a reliability $p_i$ associated therewith, the system having identifiable minimal path sets and an identifiable total number of minimal path sets, the apparatus comprising:

means for identifying the minimal path sets of the system and the total number of minimal path sets m;

means for constructing a minimal path set matrix of n×m dimension, where each element of the matrix is a 1 if the component represented belongs to the minimal path sets or is a zero otherwise;

means for constructing a design matrix from the minimal path set matrix, the design matrix comprising the minimal path set matrix if the total number of path sets is one, or if the total number of path sets is greater than one, the design matrix is constructed according to the following steps:

(1) initializing a set size K to two where the set size represents a number of sets or columns of the minimal path set matrix, (2) selecting each set of a size K al possible sets of size K, performing an OR operation on the rows of the selected set, and appending the ORed result as an additional column to the matrix, (3) repeating step (2) until all possible sets of size K have been selected, (4) incrementing the size of K by one, and (5) if the size K is not greater than m, repeating step 2;

means for constructing a vector of ones of dimension $2^m-1$ where the first m elements are "1"s, and each set of $$\binom{m}{i}$$

elements have the sign $(-1)^{i-1}$, where i ranges from 2 to m; and means for determining the reliability of the system from the design matrix, vector of ones, and reliabilities $p_i$ of each component by $$h(\underline{p}) = \sum_{j=1}^{2^m-1} 1(j) \cdot \bigcap_{i=1}^{n} p_i^{D(i,j)} \quad 0 < p_i < 1$$

where D(i,j) is the (i,j)th element of the design matrix.

5. The apparatus of claim 4, wherein each component has a state $x_i$ associated therewith, the apparatus further comprising means for determining the structure function of the system from the design matrix, vector of ones, and the states of all components after constructing a vector of ones by calculating $$\Phi(\underline{x}) = \sum_{j=1}^{2^m-1} 1(j) \cdot \bigcap_{i=1}^{n} x_i^{D(i,j)},$$

where D(i,j) is the design matrix.

* * * * *